US012063209B2

(12) United States Patent
Uhr et al.

(10) Patent No.: US 12,063,209 B2
(45) Date of Patent: Aug. 13, 2024

(54) CERTIFICATE ISSUING SYSTEM BASED ON BLOCK CHAIN

(71) Applicant: Coinplug, Inc., Gyeonggi-do (KR)

(72) Inventors: Joon Sun Uhr, Gyeonggi-do (KR); Jay Wu Hong, Seoul (KR); Joo Han Song, Gyeonggi-do (KR)

(73) Assignee: CPLABS, INC., Seongnam-si (KR)

( * ) Notice: Subject to any disclaimer, the term of this patent is extended or adjusted under 35 U.S.C. 154(b) by 81 days.

(21) Appl. No.: 17/353,244

(22) Filed: Jun. 21, 2021

(65) Prior Publication Data

US 2021/0314313 A1 Oct. 7, 2021

Related U.S. Application Data

(63) Continuation of application No. 15/749,287, filed as application No. PCT/KR2016/002226 on Mar. 7, 2016, now Pat. No. 11,082,420.

(30) Foreign Application Priority Data

Aug. 3, 2015 (KR) ........................ 10-2015-0109320

(51) Int. Cl.
*H04L 9/40* (2022.01)
*G06Q 20/00* (2012.01)
(Continued)

(52) U.S. Cl.
CPC ......... *H04L 63/0823* (2013.01); *G06Q 20/00* (2013.01); *G06Q 20/223* (2013.01);
(Continued)

(58) Field of Classification Search
CPC . H04L 63/0823; H04L 9/0643; H04L 9/0861; H04L 9/0894; H04L 9/3239;
(Continued)

(56) References Cited

U.S. PATENT DOCUMENTS

| 6,763,459 B1* | 7/2004 | Corella ................. H04L 9/3268 713/182 |
| 2015/0006895 A1* | 1/2015 | Irvine ................. G06F 21/6209 713/171 |
| 2015/0095238 A1 | 4/2015 | Khan et al. |

FOREIGN PATENT DOCUMENTS

| KR | 100870202 A | 12/2008 |
| KR | 1020090033191 B1 | 4/2009 |

(Continued)

OTHER PUBLICATIONS

Fromknecht, Conner, Dragos Velicanu, and Sophia Yakoubov. "A Decentralized Public Key Infrastructure with Identity Retention." IACR Cryptology ePrint Archive 3014 (2014)-803. (Year: 2014).*

(Continued)

*Primary Examiner* — Zeshan Qayyum
*Assistant Examiner* — Taylor S Rak
(74) *Attorney, Agent, or Firm* — Husch Blackwell LLP

(57) ABSTRACT

The present invention provides a certificate issuing system based on a block chain, the system having a means for directly generating a certificate-specific public key and a certificate-specific private key in a user terminal operated by a user, guiding the certificate-specific public key and the certificate-specific private key so as to be generated in a state in which a network in the user terminal is blocked, and eliminating the costs incurred for constructing, operating, and maintaining the certificate issuing system having a high-grade security system linked therewith so as to block hacking, which occurred in the past, as much as possible, since the certificate-specific public key requiring maintenance is stored and managed in an electronic wallet, installed in servers that hold block chains, through a peer-to-peer network (P2P)-based distributed database, not by a server run by a certificate authority (CA).

10 Claims, 17 Drawing Sheets

(51) Int. Cl.

| | |
|---|---|
| *G06Q 20/22* | (2012.01) |
| *G06Q 20/36* | (2012.01) |
| *G06Q 20/38* | (2012.01) |
| *G06Q 20/40* | (2012.01) |
| *G06Q 40/02* | (2023.01) |
| *H04L 9/00* | (2022.01) |
| *H04L 9/06* | (2006.01) |
| *H04L 9/08* | (2006.01) |
| *H04L 9/32* | (2006.01) |
| *H04L 67/104* | (2022.01) |

(52) U.S. Cl.
CPC ......... *G06Q 20/36* (2013.01); *G06Q 20/3821* (2013.01); *G06Q 20/389* (2013.01); *G06Q 20/40* (2013.01); *G06Q 40/02* (2013.01); *H04L 9/0637* (2013.01); *H04L 9/0643* (2013.01); *H04L 9/0861* (2013.01); *H04L 9/0894* (2013.01); *H04L 9/3239* (2013.01); *H04L 9/3263* (2013.01); *H04L 9/3268* (2013.01); *H04L 9/50* (2022.05); *H04L 63/083* (2013.01); *H04L 67/104* (2013.01)

(58) Field of Classification Search
CPC ....... H04L 9/3263; H04L 9/3268; H04L 9/50; G06Q 20/3821; G06Q 40/02
See application file for complete search history.

(56) References Cited

FOREIGN PATENT DOCUMENTS

| | | |
|---|---|---|
| KR | 1020130019498 A | 2/2013 |
| KR | 101525887 B1 | 6/2015 |

OTHER PUBLICATIONS

Fromknecht, Conner, Dragos Velicanu, and Sophia Yakoubov. "A Decentralized Public Key Infrastructure with Identity Retention." IACR Cryptology ePrint Archive 2014 (2014): 803.

Gasson, Mark, Martin Meints, and Kevin Warwick. "D3. 2: A study on PKI and biometrics." FIDIS deliverable (3) 2 (2005).

Bitcoin technology is also used for certificate issuance, Sep. 19, 2014, www.bloter.net/wp-content/uploads.

\* cited by examiner

FIG. 5
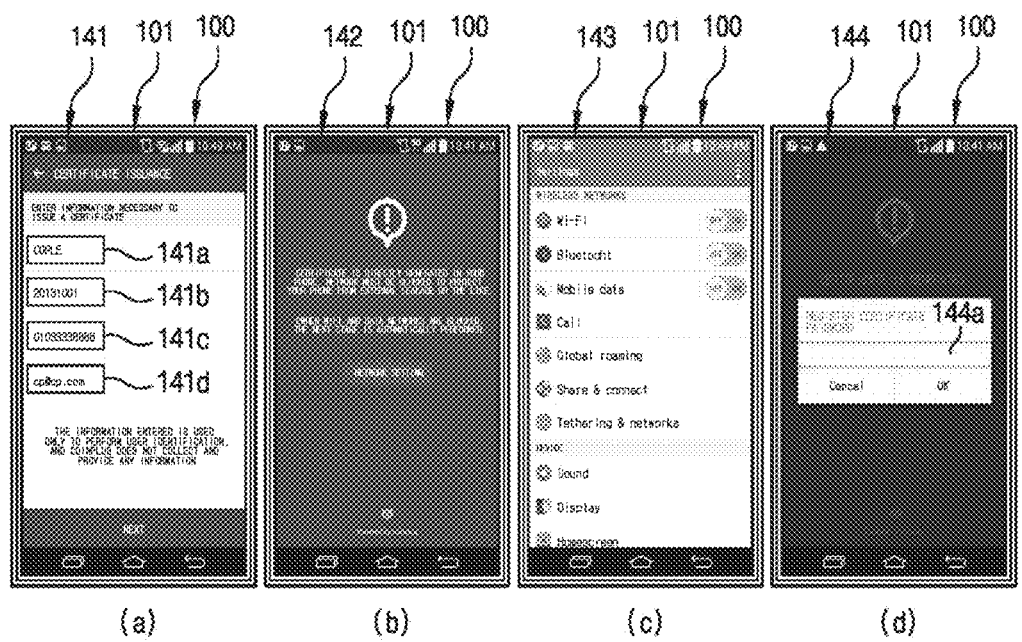
(a) (b) (c) (d)
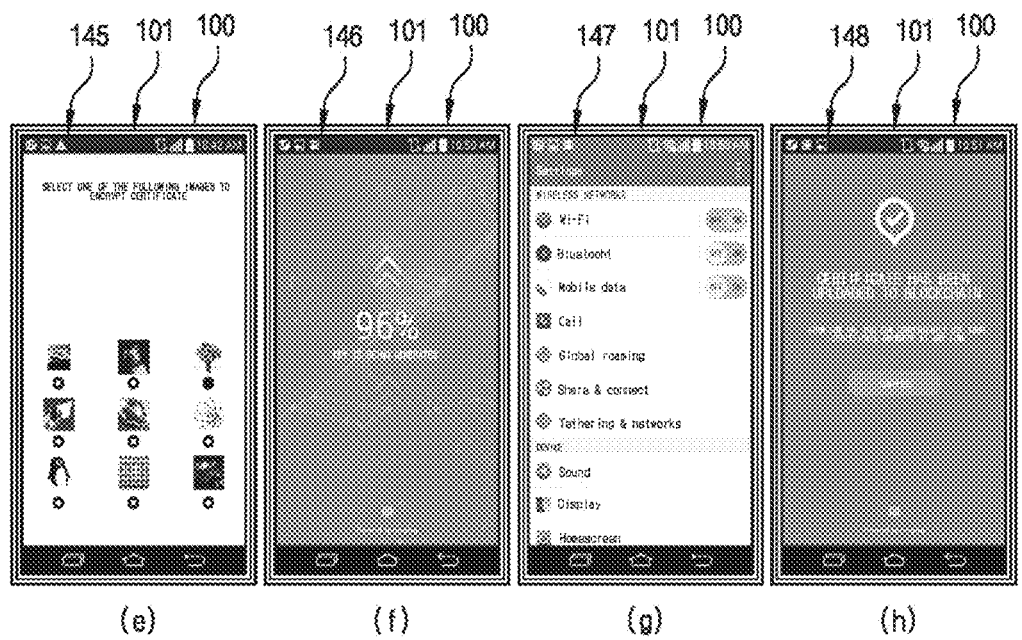
(e) (f) (g) (h)

CERTIFICATE ISSUING SYSTEM BASED ON BLOCK CHAIN

CROSS REFERENCE

This application is a continuation of U.S. patent application Ser. No. 15/749,287, filed on Jan. 31, 2018, which claims the benefit of priority from International Application PCT Patent Application No. PCT/KR2016/002226, filed Mar. 7, 2016, which itself claims priority to Korean Application No. 10-2015-0109320, filed Aug. 3, 2015, the entirety of which are hereby incorporated by reference.

TECHNICAL FIELD

The present invention relates to a blockchain-based-certificate issuing system in which a means for directly generating a certificate-specific public key and a certificate-specific private key is provided in a user terminal operated by a user, in which the user terminal is guided to generate the certificate-specific public key and the certificate-specific private key while the user terminal is not networked, and in which the certificate-specific public key, which requires maintenance, is stored and managed in electronic wallets of blockchain holding servers, through a peer-to-peer network (P2P)-based distributed database, not by a server operated by a certificate authority (CA). Thus, it is possible to eliminate costs incurred for constructing, operating, and maintaining the certificate issuing system having a high security system linked therewith so as to block conventional hacking as much as possible.

BACKGROUND ART

With the advancement of IT technology, a variety of Internet-based services can be used by anyone regardless of age and place.

In other words, services in various industries, such as a financial service of accessing a server operated by a bank or a security company and then performing account transfer or stock trading, a civil service of accessing a server operated by a government agency and then obtaining various proof documents such as a resident registration copy, and an electronic commerce service of accessing a product selling server and purchasing a product, may be provided through the Internet in real time.

On the other hand, when services in various industries are used, a user who is a customer must be authenticated. In this case, a certificate is used.

Here, a certificate, which is electronic information issued by a certificate authority (CA) to confirm the identity of a user and prevent forgery and alteration of a document, denial of trading, or the like when services in various industries are used, refers to a kind of seal certificate for cyber trading. Such certificates include certificate version, certificate serial number, certificate validity period, issuing authority, digital user signature verification information, user name, identification information, digital signature scheme, etc.

Such certificates are used in a public key infrastructure (PKI), which is a standard security scheme.

A public key infrastructure refers to a user authentication system performed by encrypting transmitted and/or received data with a public key composed of an encryption key and a decryption key and identifying a trader with a password held by an Internet user.

However, in the public key infrastructure, due to a soft token-based storage method, a user's private key exists at a standardized storage location in the form of a file. Accordingly, it is easy to perform file copy and automatic collection on the private key, and thus there is a risk of financial damage and user information theft due to leakage of the private key.

For this reason, a certificate authority (CA) should establish a certificate issuing system having a high security system linked thereto to block a hacking attempt as much as possible and should operate and maintain the established certificate issuing system. Thus, there is also a problem in that a large amount of issuing cost is needed when a conventional certificate is issued.

In addition, when a user authentication process is performed through a web browser, ActiveX must be essentially pre-installed in the certificate for the purpose of separate security.

The ActiveX that is mandatory during user authentication is a technology that is used by Microsoft to develop reusable object-oriented software components and to utilize content downloaded from the World Wide Web (WWW) by adapting Component Object Model (COM) and Object Linking and Embedding (OLE). Most ActiveX is used to create plug-ins for Internet Explorer (IE).

However, the ActiveX can be installed only when the security level of a personal computer (hereinafter referred to as a PC) is lowered so that resources of the PC, such as a file and a registry, may be accessed. Therefore, due to ActiveX, which is essentially installed for the purpose of security while the user authentication process is performed through a certificate, the security level of the user's PC is lowered, and thus not only makes risk of hacking vulnerable, but also complicates the certification process.

For this reason, the Republic of Korea is pursuing a policy of abolishing ActiveX at the government level. For example, the President of the Republic of Korea pointed out ActiveX as a representative old financial regulation at the New Year's news conference in 2015.

Furthermore, certificates, which require ActiveX to be installed for security during the certification process, can only be used by Internet Explorer (IE) provided by Microsoft among various types of web browsers and cannot be used by other web browsers (e.g., Chrome, Safari, and Firefox).

That is, when a user wants to use a certificate to perform authentication while using services in various industries such as a financial service of accessing a server operated by a bank or a security company through an Internet-based web browser and then performing account transfer or stock trading, a civil service of accessing a server operated by a government agency and then obtaining various proof documents such as a resident registration copy, and an electronic commerce service of accessing a product selling server and purchasing a product, the service can be used by means of Internet Explorer (IE) because IE supports ActiveX and cannot be used by means of the other web browsers because they do not support ActiveX. Therefore, there is a limitation in using the service.

RELATED ART DOCUMENTS

Patent Document

Patent document 1: Korean Patent No. 10-0411448, entitled "public-key infrastructure based digital certificate methods of issuing and system thereof" and published on Dec. 3, 2003.

Non-Patent Documents

Non-patent document 1: ActiveX-related content on Wikipedia (https://ko.wikipedia.org/wiki/% EC %95% A1% ED %8B % B0% EB % B8%8CX)
Non-patent document 2: Article on the MediaIT (Internet newspaper) associated with an ActiveX abolishment policy (http://www.it.co.kr/news/article.html?no=2793878&sec_no=)

DETAILED DESCRIPTION OF THE INVENTION

Technical Problem

The present invention has been devised to solve the problems of the related art. An object of the present invention is to provide a blockchain-based-certificate issuing system in which a means for directly generating a certificate-specific public key and a certificate-specific private key is provided in a user terminal operated by a user.

Another object of the present invention is to provide a blockchain-based-certificate issuing system in which the user terminal is guided to generate the certificate-specific public key and the certificate-specific private key while the user terminal is not networked.

Still another object of the present invention is to provide a blockchain-based-certificate issuing system in which the certificate-specific public key, which requires maintenance, is stored and managed in electronic wallets of blockchain holding servers not by a server operated by a certificate authority (CA) but through a peer-to-peer network (P2P)-based distributed database. Thus, it is possible to eliminate costs incurred for constructing, operating, and maintaining the certificate issuing system having a high security system linked therewith so as to block conventional hacking as much as possible.

Technical Solution

As a technical concept to achieve the present invention, a blockchain-based-certificate issuing system of the present invention includes a user terminal configured to generate a certificate-specific public key and a certificate-specific private key and transmit blockchain-based-certificate-issuance-specific personal information composed of the generated certificate-specific public key and identification information of a user needed to issue a blockchain-based certificate; a blockchain-based-certificate issuance request server configured to receive the certificate-specific public key and the blockchain-based-certificate-issuance-specific personal information from the user terminal, hash and process the blockchain-based-certificate-issuance-specific personal information to generate user identification hash information, collect and process designated user identification information corresponding to identification information of a pre-designated user among user identification information composed of the user identification hash information, the certificate-specific public key, and the blockchain-based-certificate-issuance-specific personal information to generate a public key record-specific transaction generation request signal, and transmit the generated public-key-record-specific transaction generation request signal; a blockchain-based-certificate management server configured to generate public key record-specific transaction information including the certificate-specific public key among the information collected in the public key record-specific transaction generation request signal transmitted from the blockchain-based-certificate issuance request server and also public key record-specific transaction ID information used as a key value to search for the public key record-specific transaction information, transmit and record the public key record-specific transaction information, store and manage the public key record-specific transaction ID information, hash and process the user identification hash information and the public key record-specific transaction ID information among the information collected in the public key record-specific transaction generation request signal to generate user verification hash information, generate user verification-specific transaction information including the generated user verification hash information and user verification-specific transaction ID information used as a key value to search for the user verification-specific transaction information, transmit and record the user verification-specific transaction information, store and manage the user verification-specific transaction ID information, and store and manage the designated user identification information among the information collected in the public key record-specific transaction generation request signal; and blockchain holding servers configured to authenticate a bitcoin payment through verification of bitcoin-payment-specific transaction information when the bitcoin-payment-specific transaction information is transmitted and configured to record the public key record-specific transaction information and the user verification-specific transaction information transmitted from the blockchain-based-certificate management server in blockchain of an electronic wallet in which the bitcoin-payment-specific transaction information is to be recorded according to the authentication.

Advantageous Effects of the Invention

According to the present invention, it is possible to prevent possibility of external leakage of each key by providing a means for directly generating a certificate-specific public key and a certificate-specific private key in a user terminal operated by a user and by guiding the user terminal to generate a certificate-specific public key and a certificate-specific private key while the user terminal is not networked.

According to the present invention, it is also possible to eliminate costs incurred for constructing, operating, and maintaining the certificate issuing system having a high security system linked therewith so as to block conventional hacking as much as possible because the certificate-specific public key, which requires maintenance, is stored and managed in blockchain of electronic wallets of blockchain holding servers not by a server operated by a certificate authority (CA) but through a peer-to-peer network (P2P)-based distributed database.

DESCRIPTION OF THE DRAWINGS

FIG. 5 shows a key generation notification screen unit that displays a process in which a user terminal issues a certificate-specific public key and a certificate-specific private key by means of the blockchain-based-certificate issuing system of the present invention.

BEST MODE

Figure 1:
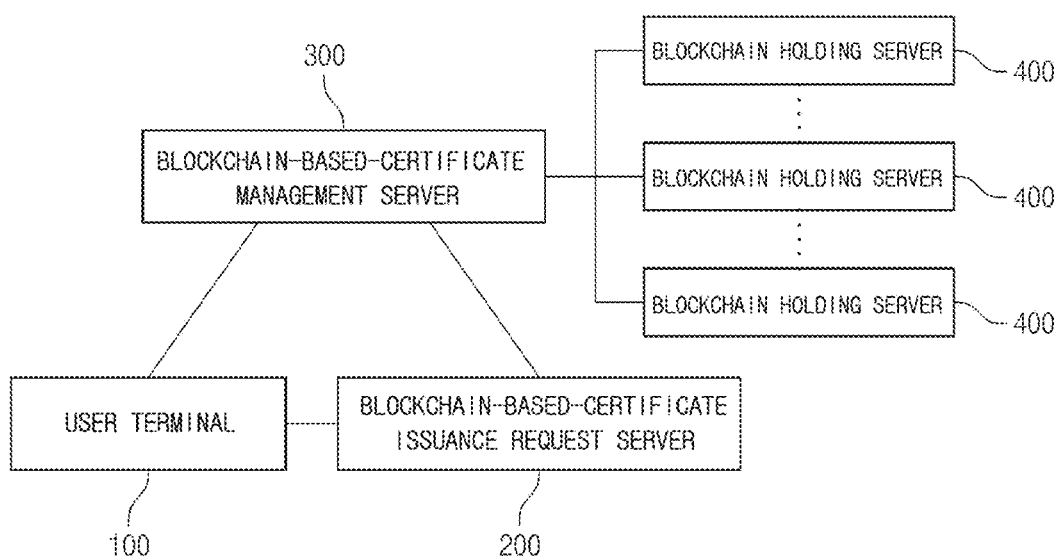
FIG. 1 is a block diagram showing a blockchain-based-certificate issuing system of the present invention.
Figure 2:
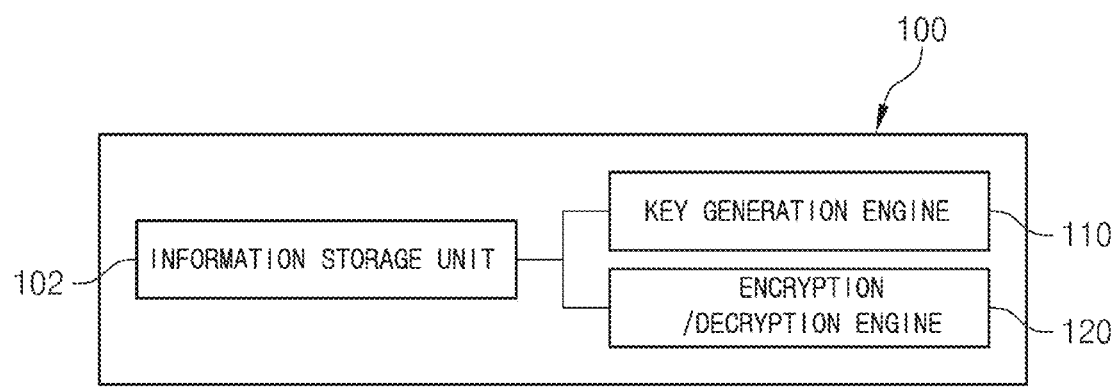
FIG. 2 is a block diagram showing elements of a user terminal, which is one element of the blockchain-based-certificate issuing system of the present invention.
Figure 3:
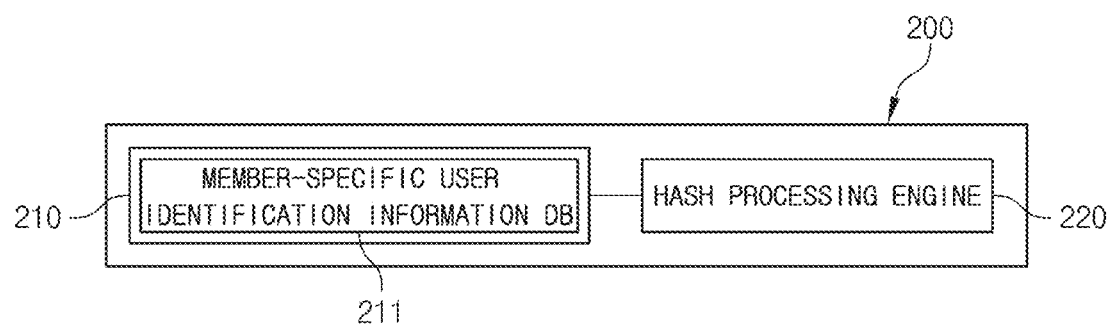
FIG. 3 is a block diagram showing elements of a blockchain-based-certificate issuance request server, which is another element of the blockchain-based-certificate issuing system of the present invention.
Figure 4:
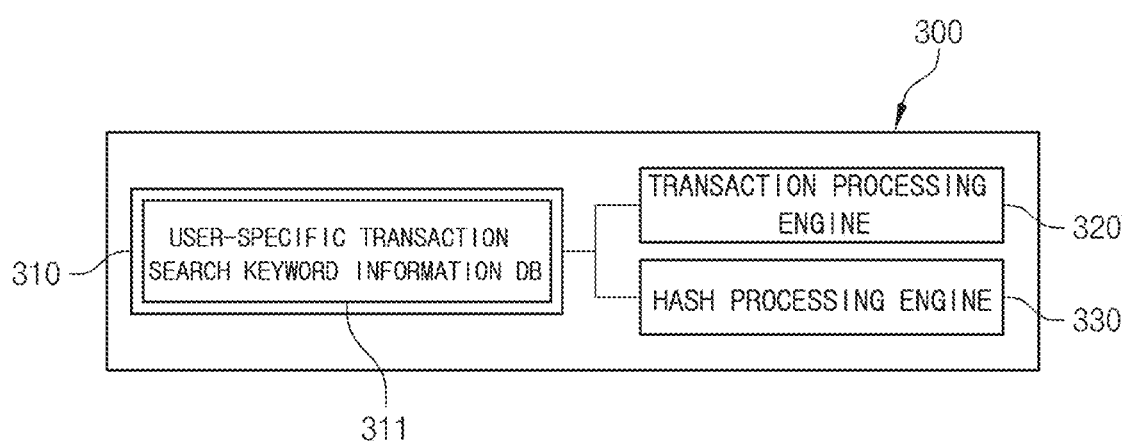
FIG. 4 is a block diagram showing elements of a blockchain-based-certificate management server, which is still another element of the blockchain-based-certificate issuing system of the present invention.
Figure 6:
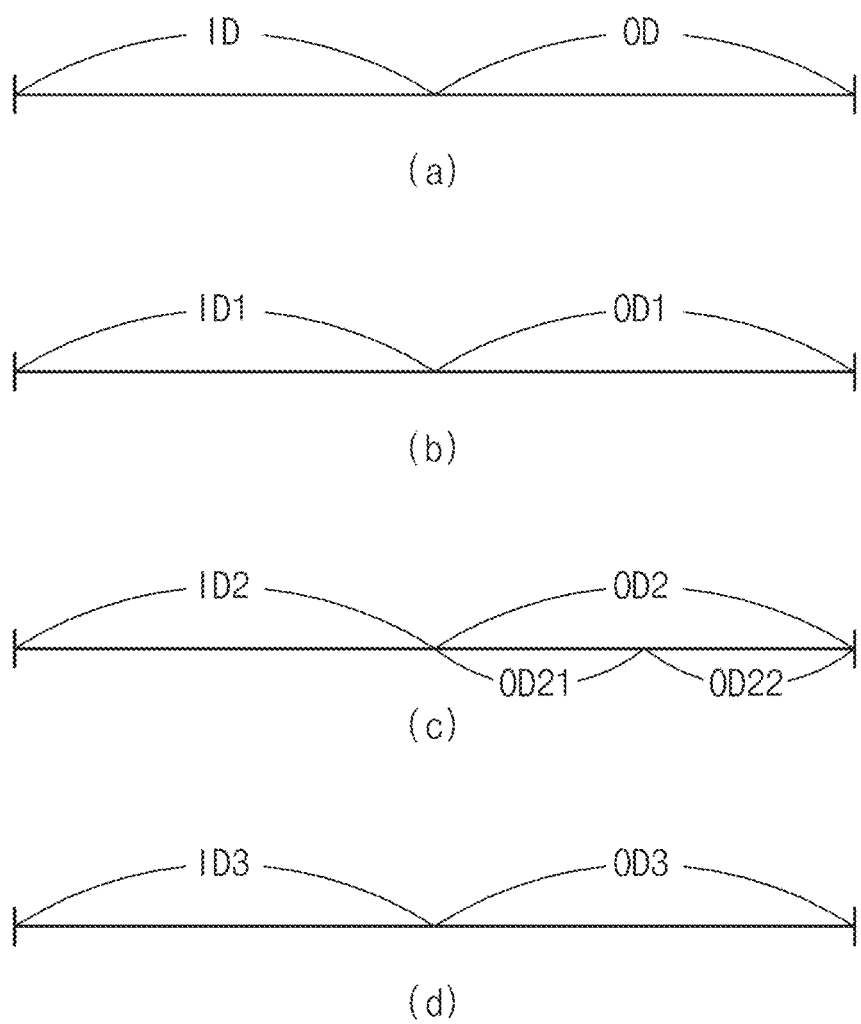
FIG. 6 briefly shows a data structure of various types of transaction information divided into input data and output data.
Figure 7:
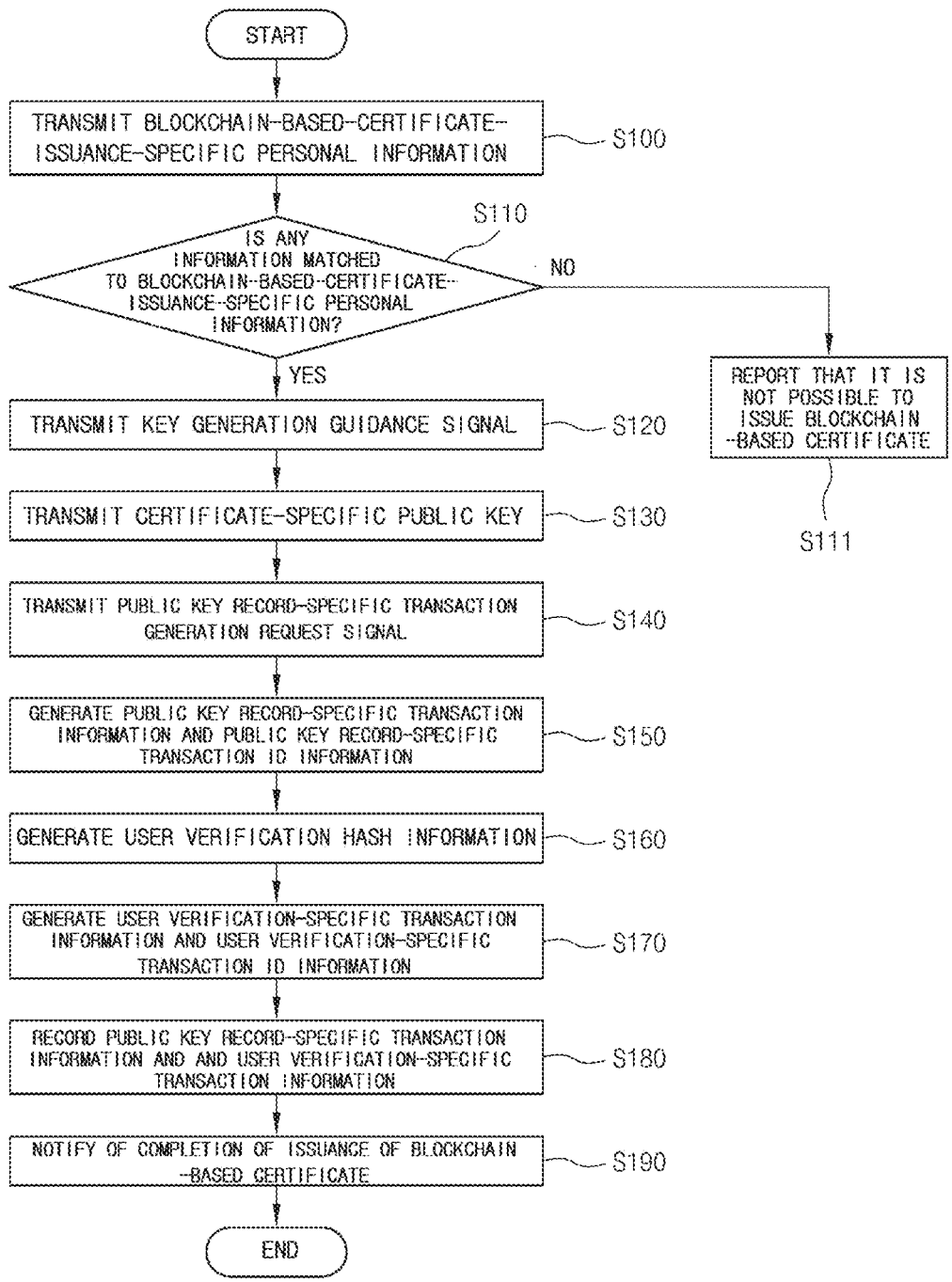
FIG. 7 is a flowchart showing a blockchain-based-certificate issuing process performed by means of the blockchain-based-certificate issuing system of the present invention.
Figure 8:
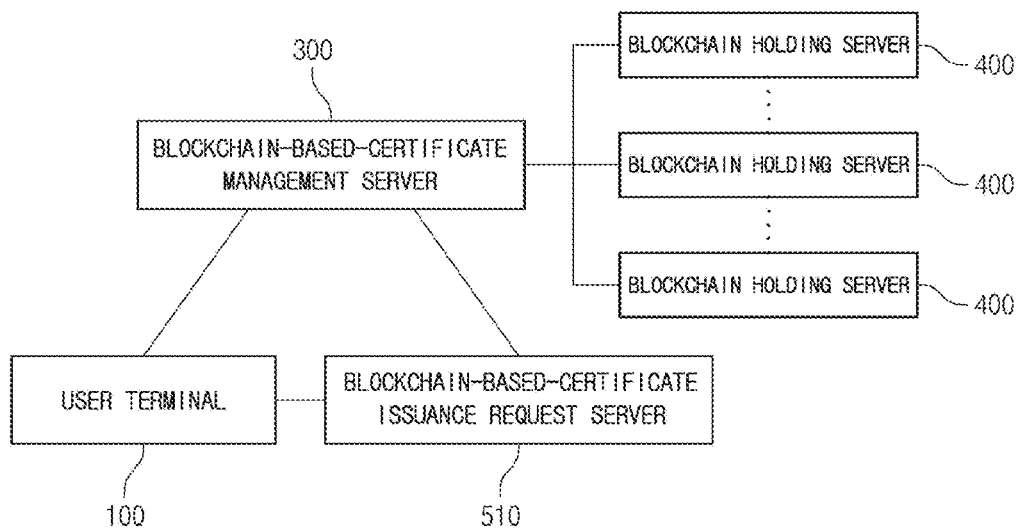
FIG. 8 is a block diagram showing a blockchain-based-certificate authentication system of the present invention.
Figure 9:
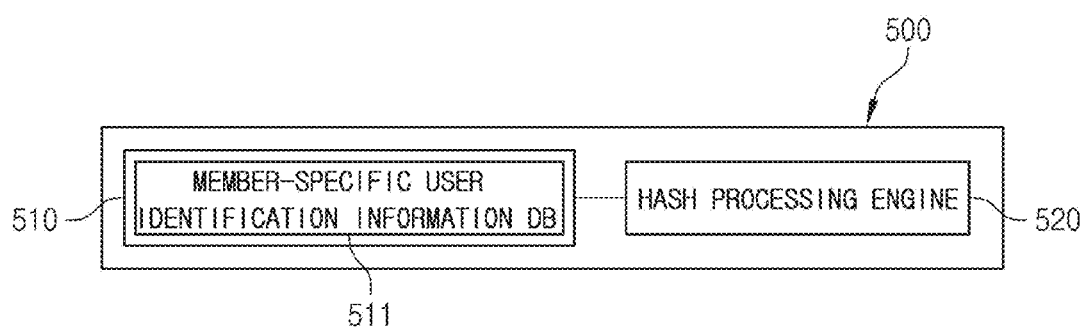
FIG. 9 is a block diagram showing elements of a blockchain-based-certificate authentication request server, which is one element of the blockchain-based-certificate authentication system of the present invention.
Figure 10:
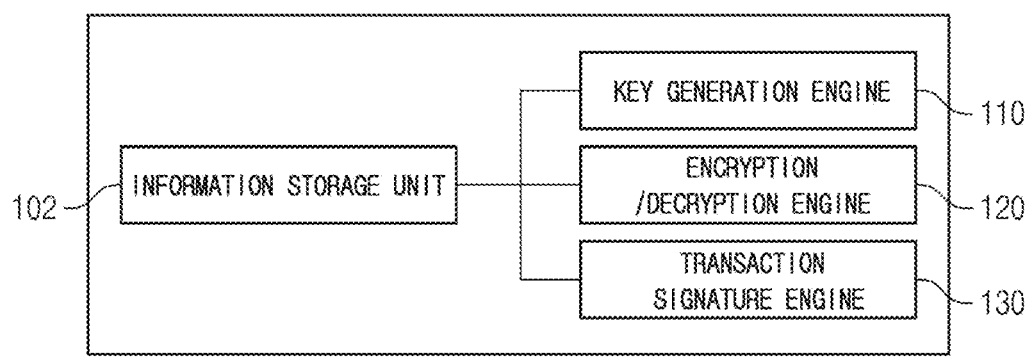
FIG. 10 is a block diagram showing elements of a user terminal, which is another element of the blockchain-based-certificate authentication system of the present invention.
Figure 11:
FIG. 11 shows a user authentication screen that displays a process in which a user selects a designated password and image in the user terminal by means of the blockchain-based-certificate authentication system of the present invention.
Figure 12:
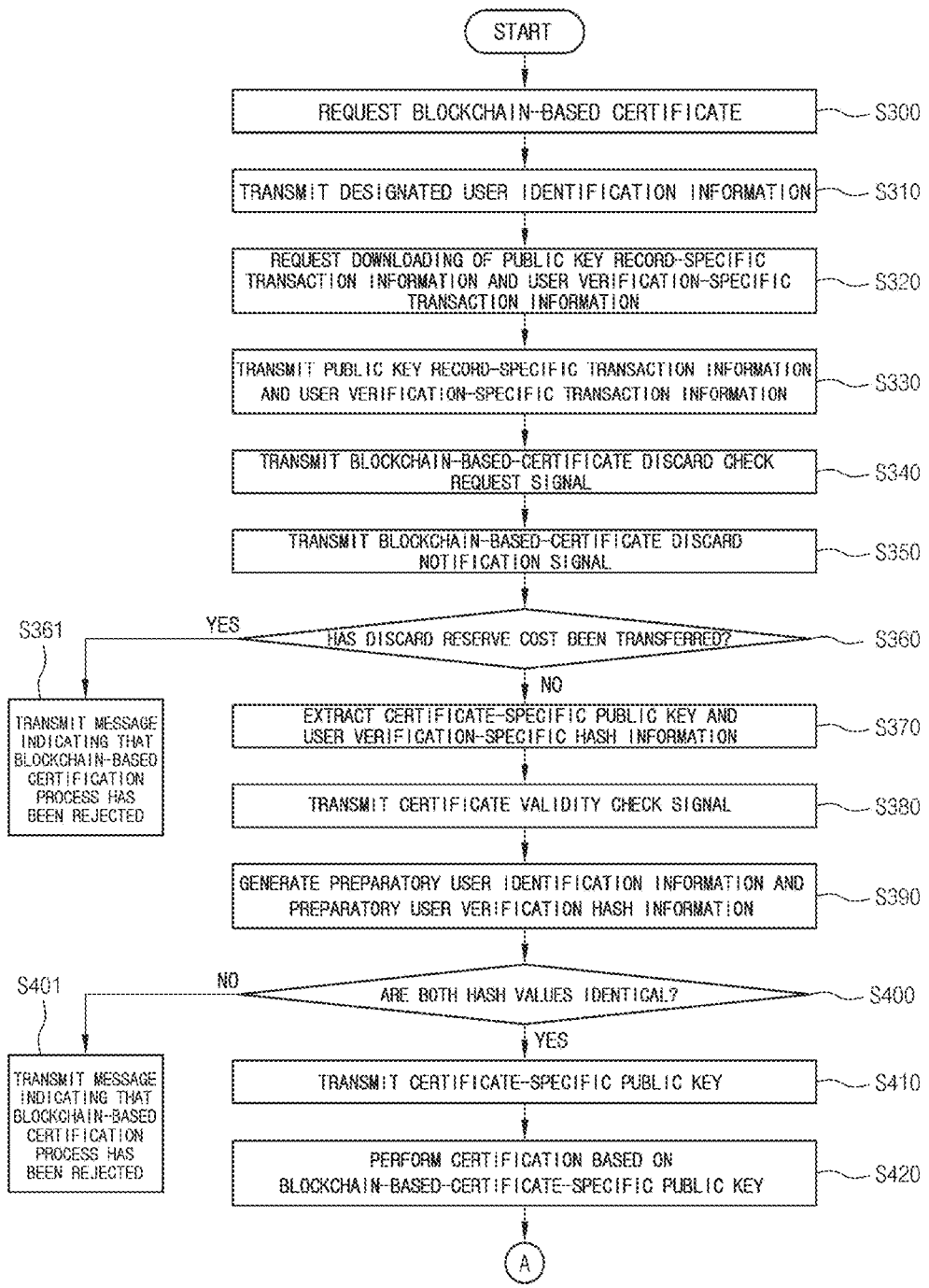
FIGS. 12 to 14 are flowcharts showing a blockchain-based-certificate authentication process performed by means of the blockchain-based-certificate authentication system of the present invention.
Figure 13:
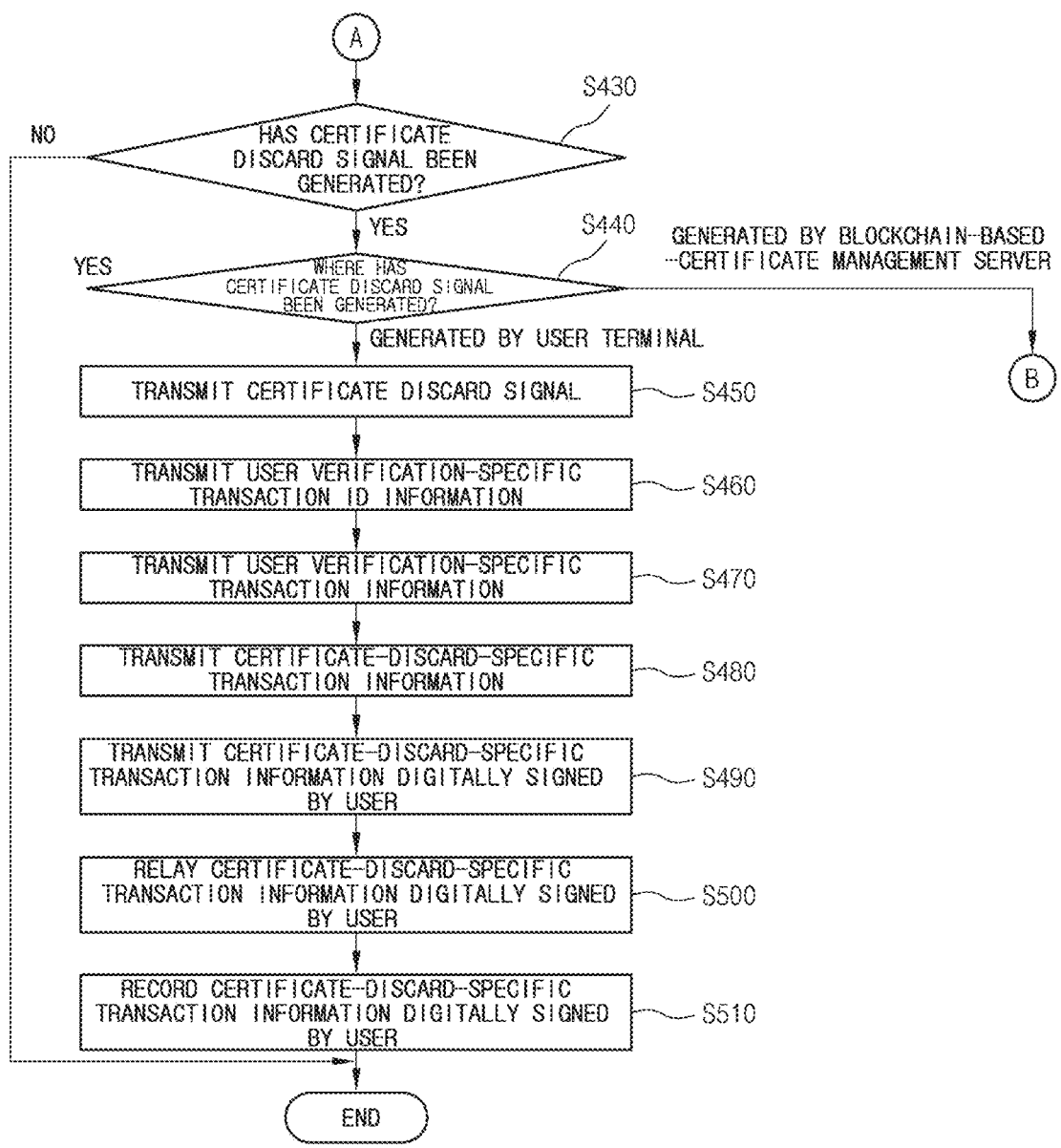
Figure 14:
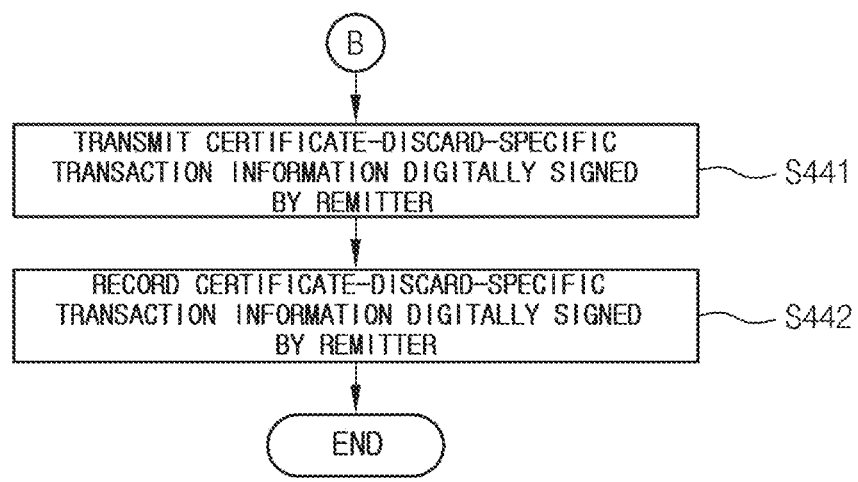

Hereinafter, the configuration and operation of an embodiment of the present invention will be described in detail with reference to the accompanying drawings, in which like reference numerals refer to like elements throughout the various embodiments.

The present invention is classified into a blockchain-based-certificate issuance part and a blockchain-based-certificate authentication part.

Here, FIGS. 1 to 7 are associated with a blockchain-based-certificate issuing system and method, which is the blockchain-based-certificate issuance part.

As shown, the blockchain-based-certificate issuing system of the present invention largely includes a user terminal 100, a blockchain-based-certificate issuance request server 200 (i.e., a certificate issuance request server), a blockchain-based-certificate management server 300 (i.e., a certificate management server), and blockchain holding servers 400 (i.e., blockchain nodes).

First, the user terminal 100 is a terminal member configured to generate a certificate-specific public key (i.e., a public key of a user) and a certificate-specific private key (i.e., a private key of the user), and transmit blockchain-based-certificate-issuance-specific personal information (i.e., pieces of personal information of the user) and the certificate-specific public key to the blockchain-based-certificate issuance request server 200, which will be described below. Here, the blockchain-based-certificate-issuance-specific personal information is information need to issue a blockchain based certificate (i.e., a certificate) and includes a user's name, date of birth, phone number, and email, etc. related to the user.

In order to perform such a function, the user terminal 100 includes an information output unit 101 configured to output information, an information storage unit 102 configured to store data or an application program, an information input unit (not shown) configured to generate an input signal of a user, and a control unit (not shown) configured to perform the overall operation of the user terminal 100 and further includes a key generation engine 110 and an encryption/decryption engine 120.

Here, the key generation engine 110, the encryption/decryption engine 120, a key generation notification screen unit, and the like, which will be described below, may be provided in the form of an application program when the user terminal 100 is a desktop computer such as a personal computer (PC) and may be installed in the form of a mobile-only app when the user terminal 100 is a mobile terminal capable of Internet access, such as a smartphone.

Also, before generating the certificate-specific public key and the certificate-specific private key, the user terminal 100 may check whether a user operating the user terminal 100 has registered identification information of the user in the blockchain-based-certificate issuance request server 200.

To this end, the blockchain-based-certificate issuance request server 200 has a DB unit 210, which includes a member-specific user identification information DB 211 (i.e., a member user identification information database) in which the identification information of the user operating the user terminal 100 is stored and also in which the identification information of a user corresponding to the blockchain-based-certificate-issuance-specific personal information is stored.

Then, the user terminal 100 transmits the blockchain-based-certificate-issuance-specific personal information to the blockchain-based-certificate issuance request server 200 to request the blockchain-based-certificate issuance request server 200 to issue a blockchain-based certificate. The blockchain-based-certificate issuance request server 200 matches the transmitted blockchain-based-certificate-issuance-specific personal information to the member-specific user identification information DB 211, and generates a key generation guidance signal for guiding the user terminal 100 to generate the certificate-specific public key and the certificate-specific private key and transmits the generated key generation guidance signal to the user terminal 100 when there is matching information, i.e., when at least one of the pieces of the personal information of the user matches any of the information within the member user identification information database.

When the key generation guidance signal is transmitted from the blockchain-based-certificate issuance request server 200, the user terminal 100 operates the key generation engine 110 to generate the certificate-specific public key and the certificate-specific private key. In this case, the user terminal 100 performs control so that the certificate-specific public key and the certificate-specific private key may be generated while a network is blocked, and thus prevents possibility of external leakage.

In addition, the user terminal 100 operates and controls the encryption/decryption engine 120 to encrypt and process the certificate-specific private key on the basis of a password and a photo image designated by the user to generate an encrypted certificate-specific private key (i.e., an encrypted private key) and store the encrypted certificate-specific private key in the information storage unit 102.

Thus, even if the certificate-specific private key of the user is leaked, it is actually difficult to deduce the password and the photo image designated by the user, thereby minimizing risk of information theft.

Also, a key generation notification screen unit in which the certificate-specific public key and the certificate-specific private key are issued in the user terminal 100 is stored in the information storage unit 102 of the user terminal 100.

The store key generation notification screen unit is composed of a user identification information input screen 141 including a user name input box 141a to which the user's name will be entered, a user date-of-birth input box 141b to which the user's date of birth will be entered, a user phone number input box 141c to which the user's phone number will be entered, and a user email input box 141d to which the user's email will be entered; a network block notification screen 142 indicating that a network connected to the user terminal 100 will be blocked before the certificate-specific public key and the certificate-specific private key are generated, a network block indication screen 143 indicating that the network of the user terminal 100 is blocked, a password input screen 144 including a password input box 144a to which a password needed to issue the blockchain-based certificate will be entered, an image selection screen 145 in which a plurality of images are selectably displayed, a key generation notification screen 146 indicating that the certificate-specific public key and the certificate-specific private key are generated, a network connection indication screen 147 indicating that the network that has been blocked is reconnected after the certificate-specific public key and the certificate-specific private key are generated, and an issuance completion notification screen 148 indicating that the issuance of the blockchain-based certificate is complete.

The blockchain-based-certificate issuance request server 200 is a server member configured to receive the certificate-specific public key and the blockchain-based-certificate-issuance-specific personal information from the user terminal 100, configured to hash and process the blockchain-based-certificate-issuance-specific personal information to generate user identification hash information (i.e., identification hash information), configured to collect and process user identification information, the certificate-specific public key, and the blockchain-based-certificate-issuance-specific personal information to generate a public key record-specific transaction generation request signal (i.e., a certificate registration request), and configured to transmit the public key record-specific transaction generation request signal to a blockchain-based-certificate management server 300. Here, the user identification information may represent specific personal information pre-designed among the blockchain-based-certificate-issuance-specific personal information. For example, the user identification information may use the user's phone number, in particular, the user's mobile phone number.

In order to perform such a function, the blockchain-based-certificate issuance request server 200 has a hash processing engine 220.

As described above, the hash processing engine 220 of the blockchain-based-certificate issuance request server 200 performs a function of hashing the blockchain-based-certificate-issuance-specific personal information to generate the user identification hash information.

The blockchain-based-certificate management server 300 is a member configured to generate public key record-specific transaction information (i.e., a certification transaction) including certificate-specific public key among the information collected in the public key record-specific transaction generation request signal transmitted from the blockchain-based-certificate issuance request server 200 and public key record-specific transaction ID information (i.e., a certification transaction ID) used as a key value to search for the public key record-specific transaction information, configured to transmit and record the public key record-specific transaction information among the generated information, configured to store and manage the public key record-specific transaction ID information, configured to hash user identification hash information and the public key record-specific transaction ID information among the information collected in the public key record-specific transaction generation request signal to generate user verification hash information (i.e., verification hash information), configured to generate user verification-specific transaction information (i.e., a verification transaction) including the generated user verification hash information and user verification-specific transaction ID information (i.e., a verification transaction ID) used as a key value to search for the user verification-specific transaction information, configured to transmit and record the user verification-specific transaction information among the generated information, configured to store and manage the user verification-specific transaction ID information, and configured to store and manage the user identification information among the information collected in the public key record-specific transaction generation request signal.

In order to perform such a function, the blockchain-based-certificate management server 300 includes a DB unit 310 having a user transaction search keyword information DB 311, a transaction processing engine 320, and a hash processing engine 330.

First, the transaction processing engine 320 stores the user identification information in the user transaction search keyword information DB 311 and generates the public key record-specific transaction information including the certificate-specific public key and the public key record-specific transaction ID information used as a key value to search for the public key record-specific transaction information.

The hash processing engine 330 hashes the user identification hash information and the public key record-specific transaction ID information among the information collected in the public key record-specific transaction generation request signal to generate the user verification hash information.

Also, the transaction processing engine 320 is configured to transmit and record the public key record-specific transaction information to and in the blockchain holding servers 400 which are blockchain nodes of a blockchain network, configured to match the public key record-specific transaction ID information with the user identification information in the user-specific transaction search keyword information DB 311, configured to generate the user verification-specific transaction information including the user verification hash information and the user verification-specific transaction ID information used as a key value to search for the user verification-specific transaction information, configured to transmit and record the user verification-specific transaction information among the generated information to and in the blockchain holding servers 400, and configured to match the user verification-specific transaction ID information with the user identification information in the user-specific transaction search keyword information DB 311.

The blockchain-based-certificate management server 300, which performs such a function, may be used as a server of a company that requires certification to be performed when a service is used, for example, a server operate by a bank or a security company, a server operated by a government agency, a server operated by a shopping mall for performing an Internet e-commerce, or the like.

Referring to FIG. 6A, bitcoin-payment-specific transaction information to be recoded in blockchain included in an electronic wallet of the blockchain holding server 400, which will be described below, is data that includes previous bitcoin-payment-specific transaction ID information used to identify a storage position of a bitcoin to be used among bitcoins held by a remitter through previous bitcoin-payment-specific transaction information; bitcoin authorization information of the remitter; a bitcoin-payment-specific public key needed to determine validity of the bitcoin authorization information; OP_DUP information reporting that a transaction is for bitcoin trading; and remittee identification information for identifying a remittee and the number of bitcoins to be remitted.

Here, the previous bitcoin-payment-specific transaction ID information is information that is used as a key value to search for the previous bitcoin-payment-specific transaction information. The bitcoin authorization information of the remitter is digital signature information of the remitter, and the remitter corresponds to a user who sends a bitcoin in the previous bitcoin-payment-specific transaction information.

Also, the bitcoin-payment-specific transaction information has a data structure divided into input data ID and output data OD. The previous bitcoin-payment-specific transaction ID information, the bitcoin authorization information of the remitter, and the bitcoin-payment-specific public key are divisionally stored as the input data ID, and the OP_DUP information, the number of bitcoins, and the remitter identification information are divisionally stored as the output data OD.

Also, referring to FIG. 6B, the public key record-specific transaction information is data that includes previous bitcoin-payment-specific transaction ID information used to identify a storage position of a bitcoin to be used among bitcoins held by a remitter through previous bitcoin-payment-specific transaction information; bitcoin authorization information of the remitter; a bitcoin-payment-specific public key needed to determine validity of the bitcoin authorization information; public-key registration cost information corresponding to a cost required to register the certificate-specific public key needed to issue the blockchain-based certificate; Operation Code RETURN (OP_RETURN) information reporting that a transaction is not for bitcoin trading but for information recording; and the certificate-specific public key.

In this case, the public key record-specific transaction information has a data structure divided into input data ID1 and output data OD1. The previous bitcoin-payment-specific transaction ID information, the bitcoin authorization information of the remitter, the bitcoin-payment-specific public key, and the public-key registration cost information are divisionally stored as the input data ID1. The OP_RETURN information and the certificate-specific public key are divisionally stored as the output data OD1.

Here, the public-key registration cost information is a cost that is paid to an involved miner to register the public key record-specific transaction information in the blockchain included in the electronic wallet of each of the blockchain holding servers 400, and the cost is about 0.0001 bitcoin. In addition, user verification hash registration cost information, which will be described below, is also a cost that is paid to the involved miner to register the user verification-specific transaction information in the blockchain included in the electronic wallet of each of the blockchain holding servers 400.

As of July 2015, 0.0001 bitcoin has a low cost of about 40 won, and a low cost of less than 100 won is required as the total cost for issuing a bitcoin-based certificate.

In addition, referring to FIG. 6C, the user verification-specific transaction information is data that includes previous bitcoin-payment-specific transaction ID information used to identify a storage position of a bitcoin to be used among bitcoins held by a remitter through previous bitcoin-payment-specific transaction information; bitcoin authorization information of the remitter; a bitcoin-payment-specific public key needed to determine validity of the bitcoin authorization information; user verification hash registration cost information corresponding to a cost required to register user verification hash information needed to issue a blockchain-based certificate; blockchain-based-certificate discard reserve cost information corresponding to a cost used to discard a blockchain-based certificate; OP_RETURN information reporting that a transaction is not for bitcoin trading but for information recording; blockchain-based-certificate discard check information including discard reserve cost transfer information in which a discard-prepared-reserve-specific bitcoin address and a blockchain-based-certificate discard reserve cost are displayed in order to transfer the blockchain-based-certificate discard reserve cost, which corresponds to the blockchain-based-certificate discard reserve cost information, to the designated bitcoin address when the user verification transaction information is recorded in the blockchain of the blockchain holding servers 400; and user verification hash information.

Thus, each of the blockchain holding servers 400 records the user verification-specific transaction information and also records information indicating that the blockchain-based-certificate discard reserve cost information is transferred to and charged in the designated discard-prepared-reserve-specific bitcoin address with reference to the blockchain-based-certificate discard check information, thus providing the blockchain-based-certificate discard reserve cost information so that the blockchain-based-certificate discard reserve cost information may be utilized as data for checking whether the blockchain-based certificate is discarded.

Also, the user verification-specific transaction information has a data structure divided into input data ID2 and output data OD2. The previous bitcoin-payment-specific transaction ID information, the bitcoin authorization information of the remitter, the bitcoin-payment-specific public key, the blockchain-based-certificate discard reserve cost information, and the user verification hash registration cost information are divisionally stored as the input data ID1. The OP_RETURN information, the block-chain-based certificate discard check information, and the user verification hash information are divisionally stored as the output data OD2.

The blockchain holding servers 400 are devices that constitute a bitcoin network performing bitcoin payments by authenticating and recording the bitcoin payments.

Here, bitcoin will be briefly described. Bitcoin is a digital currency that was created by Satoshi Nakamoto in 2009 and is capable of being settled for the existing goods. Bitcoin has a structure in which there is no central apparatus for issuing and managing currency. Rather, bitcoin trading is performed by a peer-to-peer (P2P)-network-based distributed database on the basis of public key cryptography.

Bitcoin, which has the above payment system, has an advantage of usage without information such as card number, expiration date, and CCV number required for payment by credit card, and a low usage fee. Also, bitcoin is stored in an electronic wallet having the form of a file, and a unique address (a public address) is assigned to the electronic wallet. Accordingly, bitcoin trading is performed on the basis of the address.

First, in order to use the bitcoin having the aforementioned payment characteristics, a bitcoin user joins a bitcoin exchange (e.g., www.coinplug.com), opens an electronic wallet, and then charges the electronic wallet with KRW corresponding to the Korean Republic Won. Subsequently, the bitcoin user checks current prices of bitcoins being traded on the bitcoin exchange, makes a purchase order by entering the quantity and unit price of bitcoins desired to be purchased, and performs a trading through an sales order matching a trading condition. Thus, the user may perform payment with bitcoins when purchasing a product.

As described above, a server operated by a bitcoin exchange may be made as a member in each of the blockchain holding servers 400.

To this end, an individual blockchain holding servers 400 should have an electronic wallet with blockchain. By using the electronic wallet of the blockchain holding server 400, when bitcoin-payment-specific transaction information generated according to a general bitcoin payment is received, the bitcoin payment is authenticated through verification of the received bitcoin-payment-specific transaction information, the bitcoin-payment-specific transaction information is recorded in the blockchain according to the authentication, and the bitcoin-payment-specific transaction information is propagated to other designated blockchain holding servers 400 at the next stage.

That is, the propagation of the bitcoin-payment-specific transaction information is defined by a communication protocol. When bitcoin-payment-specific transaction information is generated, one node (hereinafter referred to as a blockchain holding server) propagates the bitcoin-payment-specific transaction information to eight designated nodes, and then each of the eight nodes that have received the bitcoin-payment-specific transaction information propagates the bitcoin-payment-specific transaction information to eight designated nodes. Through such pyramidal propagation, the propagation is completed by propagating the bitcoin-payment-specific transaction information to all blockchain holding servers 400 having electronic wallets with the blockchain needed to perform a bitcoin payment.

As described above, it is not possible to forge all transaction information including the above-described public key record-specific transaction information and user verification-specific transaction information as well as the bitcoin-payment-specific transaction information recorded in the blockchain.

A server (or a terminal) operated by a miner that mines a bitcoin or a user terminal (e.g., a PC or a smartphone) used for a bitcoin payment, which has an electronic wallet with blockchain, may be made as one member of the blockchain holding servers 400.

In addition, the bitcoin payment is basically performed on the basis of an electronic wallet with blockchain. Such payment based on an electronic wallet with blockchain may be applied to Litecoin, Darkcoin, Namecoin, Dogecoin, Ripple, and the like, which may be substituted for bitcoin when forgery verification is performed on certificate documents of financial institutions according to the present invention.

In addition to bitcoin-payment-specific transaction information for a general bitcoin payment, the above-described personal information may also be recorded in the blockchain of the blockchain holding server 400. That is, the public key record-specific transaction information including the certificate-specific public key and the user verification-specific transaction information including the user verification hash information, which are needed to perform bitcoin-based certification may also be recorded in the blockchain.

That is, when OP_RETURN information is added to transaction information, which is trading information generated during the bitcoin payment and the transaction information is transmitted, an electronic wallet of an individual blockchain holding server 400 handles and propagates the transaction information as private information rather than the general bitcoin payment, and OP_RETURN information is recorded in certificate-verification-specific transaction information. Thus, the electronic wallet is utilized as a main element for determining prevention of forgery of digital content.

Here, when an OP return message is read from bitcoin-payment-specific transaction information generated when the bitcoin payment is authenticated by the electronic wallet of the blockchain holding server 400, the OP_RETURN information serves to notify that information in which the OP return message is recorded is not bitcoin transaction information but any 40-byte data value.

As describe above, the certification transaction and the verification transaction are registered in the blockchain network using the bitcoin.

However, the certification transaction and the verification transaction may be registered in the blockchain network using cryptocurrency such as ethereum, ripple, etc. In case the blockchain network registers a data transaction, not a cryptocurrency transfer transaction, each of the certification transaction and the verification transaction may not include the Operation Code RETURN information.

For example, the certificate management server broadcasts each of the certification transaction and the verification transaction to the blockchain nodes of the blockchain network.

Then, the blockchain nodes register the certification transaction and the verification transaction in the distributed ledger of the blockchain network.

In detail, the blockchain nodes generate either of (i) a block including the certification transaction and the verification transaction and (ii) two blocks including the certification transaction and the verification transaction respectively, and register either of (i) the block including the certification transaction and the verification transaction and (ii) the two blocks including the certification transaction and the verification transaction respectively in the distributed ledger of the blockchain network by distributed consensus.

Then, the certificate management server confirms whether the certification transaction and the verification transaction are registered in the distributed ledger of the blockchain network by using the certification transaction ID and the verification transaction ID. When a registration of the certification transaction and the verification transaction in the distributed ledger is confirmed, the certificate management server notifies a certificate registration result to the user terminal.

A process of issuing a blockchain-based certificate by means of a blockchain-based-certificate issuing system of the present invention will be described as follows.

When a user accesses a blockchain-based-certificate issuance request server 200 by running a mobile-only app (or a dedicated program) installed in a user terminal 100 to guide issuance of a bitcoin-based certificate, the mobile-only app operated by the user terminal 100 (hereinafter referred to as a mobile-only app controlled by a user terminal for convenience of description) extracts a user identification information input screen 141 stored in an information storage unit 102 and outputs the user identification information input screen 141 to an information output unit 101.

The user enters information into a user name input box 141a for the user's name, a user date-of-birth input box 141b for the user's date of birth, a user phone number input box 141c for the user's phone number, and a user email input box 141d for the user's email according to an input form and then requests transmission of the information.

The user terminal 100 collects and processes the user's name, the user's date of birth, the user's phone number, and the user's email to generate blockchain-based-certificate-issuance-specific personal information and transmits the blockchain-based-certificate-issuance-specific personal information to the blockchain-based-certificate issuance request server 200 to request issuance of a blockchain-based certificate (S100).

The blockchain-based-certificate issuance request server 200 matches the transmitted blockchain-based-certificate-issuance-specific personal information to a member-specific user identification information DB 211 and checks whether there is matching information (S110) and transmits a message indicating that the blockchain-based certificate is not allowed to be issued to the user terminal 100 when there is no matching information (S111).

Also, when there is matching information, the blockchain-based-certificate issuance request server 200 generates a key generation guidance signal for guiding the user terminal 100 to generate a certificate-specific public key and a certificate-specific private key, and then transmits the generated key generation guidance signal to the user terminal 100 (S120).

When the key generation guidance signal is transmitted, the user terminal 100 extracts a network block notification screen 142 from the information storage unit 102 and outputs the network block notification screen 142 to the information output unit 101.

When the user reads the output network block notification screen 142 and clicks a menu for request network settings, the user terminal 100 extracts a network block indication screen 143 stored in the information storage unit 102 and outputs the network block indication screen 143 to the information output unit 101. Subsequently, the user blocks a connected network such as WiFi through the output network block indication screen 143.

Subsequently, when the user terminal 100 extracts and outputs a password input screen 144 stored in the information storage unit 102 to the information output unit 101, the user enters a password into a password input box 144a of the password input screen 144 and clicks an OK menu.

Subsequently, the user terminal 100 extracts an image selection screen 145 stored in the information storage unit 102 and outputs the image selection screen 145 to the information output unit 101. Subsequently, the user selects a desired image from among a plurality of images displayed on the output image selection screen 145.

Subsequently, the user terminal 100 operates and controls the key generation engine 110 to generate a certificate-specific public key and a certificate-specific private key. In this case, the user terminal 100 outputs a key generation notification screen 146 stored in the information storage unit 102 to notify the user that the certificate-specific public key and the certificate-specific private key have been generated.

Subsequently, when the certificate-specific public key and the certificate-specific private key are generated, the user terminal 100 operates the encryption/decryption engine 120 to encrypt and process the certificate-specific private key on the basis of a password and a photo image designated by the user to generate an encrypted certificate-specific private key. Then, the user terminal 100 stores the encrypted certificate-specific private key in the information storage unit 102.

Subsequently, when the encrypted certificate-specific private key is stored, the user terminal 100 outputs a message to reconnect the network, and the user makes a connection to the network.

Subsequently, the user terminal 100 outputs a network connection indication screen 147 stored in the information storage unit 102 to notify the user that the network has been reconnected.

Subsequently, the user terminal 100 transmits the certificate-specific public key to the blockchain-based-certificate issuance request server 200 (S130).

When the certificate-specific public key is received, the blockchain-based-certificate issuance request server 200 operates the hash processing engine 220 to hash and process the blockchain-based-certificate-issuance-specific personal information to generate user identification hash information, collects designated user identification information corresponding to pre-designated user identification information among user identification information composed of the user identification hash information, the certificate-specific public key, and the blockchain-based-certificate-issuance-specific personal information to generate a public key record-specific transaction generation request signal, and transmits the public key record-specific transaction generation request signal to a blockchain-based-certificate management server 300 (S140).

Also, the blockchain-based-certificate management server 300 operates a transaction processing engine 320 to store the designated user identification information among the information collected in the transmitted public key record-specific transaction generation request signal in a user-specific transaction search keyword information DB 311 and generates public key record-specific transaction information including the certificate-specific public key and public key record-specific transaction ID information used as a key value to search for the public key record-specific transaction information (S150).

Subsequently, the blockchain-based-certificate management server 300 operates a hash processing engine 330 to hash and process the user identification hash information and the public key record-specific transaction ID information among the information collected in the public key record-specific transaction generation request signal to generate user verification hash information (S160).

Subsequently, the blockchain-based-certificate management server 300 operates the transaction processing engine 320 to transmit and record the public key record-specific transaction information to and in the blockchain holding servers 400 and to store the public key record-specific transaction ID information in the user-specific transaction search keyword information DB 311, generates user verification-specific transaction information including the user verification hash information and user verification-specific transaction ID information used as a key value to search for the user verification-specific transaction information, transmits and records the user verification-specific transaction information among the generated information to and in the blockchain holding servers 400, and stores and manages the user verification-specific transaction ID information in the user-specific transaction search keyword information DB 311 (S170).

The blockchain holding servers 400 record the transmitted public key record-specific transaction information and user verification-specific transaction information in the blockchain to complete issuance of a blockchain-based certificate (S180).

When the issuance of the blockchain-based certificate is completed, the blockchain-based-certificate management server 300 notifies the user terminal 100 of the completion of the issuance of the blockchain-based certificate (S190).

The user terminal 100 outputs an issuance completion notification screen 148 stored in the information storage unit 102 through the information output unit 101 so that the user may recognize the completion of the issuance.

FIGS. 8 to 14 are associated with a blockchain-based-certificate authentication system and method, which is the blockchain-based-certificate authentication part. Before describing the drawings, it should be noted that the content mentioned in the certificate issuance part will be omitted.

As shown, the blockchain-based-certificate authentication system of the present invention includes a user terminal 100, a blockchain-based-certificate authentication request server 500, a blockchain-based-certificate management server 300, and blockchain holding servers 400.

First, the user terminal 100 is a terminal member that requests blockchain-based certification.

The blockchain-based-certificate authentication request server 500 is a server member that transmits designated user identification information of a corresponding user operating the user terminal 100 according to the request for the blockchain-based certification of the user terminal 100 and relays the request for the blockchain-based certification.

To this end, the blockchain-based-certificate authentication request server 500 includes a DB unit 510, and the included DB unit 510 has a member-specific user identification information DB 511 in which identification information of the user operating the user terminal 100 is stored and also in which user identification information identical to blockchain-based-certificate-issuance-specific composed of user identification information that has been used when the blockchain-based certificate is issued and designated user identification information corresponding to pre-designated user identification information among the user identification information are stored.

On the basis of this, the blockchain-based-certificate authentication request server 500 extracts the designated user identification information of the user operating the user terminal 100 from the user identification information DB 511 according to the request for the blockchain-based certification of the user terminal 100 and transmits the designated user identification information to the blockchain-based-certificate management server 300.

The blockchain-based-certificate management server 300 is a server member that transmits public key record-specific transaction ID information and user verification-specific transaction ID information matched to the designated user identification information transmitted from the blockchain-based-certificate authentication request server 500 to request downloading of public key record-specific transaction information and user verification-specific transaction information.

To this end, the blockchain-based-certificate management server 300 has a DB unit 310, which includes a user-specific transaction search keyword information DB 311 in which the designated user identification information corresponding to the pre-designated user identification information among user identification information identical to the blockchain-based-certificate-issuance-specific personal information composed of user identification information that has been used when the blockchain-based certificate is issued, the public key record-specific transaction ID information used as a key value to search for the public key record-specific transaction information, and the user verification-specific transaction ID information used as a key value to search for the user verification-specific transaction information are stored.

Here, the user verification-specific transaction information includes discard reserve cost transfer information in which a discard-prepared-reserve-specific bitcoin address and a blockchain-based-certificate discard reserve cost are displayed in order to transfer the blockchain-based-certificate discard reserve cost, which corresponds to the blockchain-based-certificate discard reserve cost information, to the designated bitcoin address when a blockchain-based-certificate discard reserve cost information, which is a cost to be used to discard the blockchain-based certificate, and corresponding user verification-specific transaction information are recorded in the blockchain of the blockchain holding servers 400.

Thus, a transaction processing engine 320 of the blockchain-based-certificate management server 300 extracts the discard-prepared-reserve-specific bitcoin address included in the discard reserve cost transfer information among the information included in the user verification-specific transaction information, generates a blockchain-based-certificate discard check request signal for inquiring about whether a blockchain-based-certificate discard reserve cost corresponding to the amount of bitcoin charged in the extracted discard-prepared-reserve-specific bitcoin address is transferred, and transmits the generated blockchain-based-certificate discard check request signal to the blockchain holding servers 400. Here, the blockchain-based-certificate discard check request signal may be set to a plurality of blockchain holding servers 400 or a pre-designated single blockchain holding server 400.

The blockchain holding server 400 matches the discard-prepared-reserve-specific bitcoin address included in the transmitted blockchain-based-certificate discard check request signal to the blockchain and transmits, to the blockchain-based-certificate management server 300, a blockchain-based-certificate discard notification signal for notifying of whether the blockchain-based-certificate discard reserve cost charged in the matched discard-prepared-reserve-specific bitcoin address is transferred.

When the blockchain-based-certificate discard reserve cost charged in the discard-prepared-reserve-specific bitcoin address is transferred, with reference to the blockchain-based-certificate discard notification information, the transaction processing engine 320 of the blockchain-based-certificate management server 300 performs control so that a message indicating that the blockchain-based certification process has been rejected may be transmitted to the user terminal 100.

Also, the blockchain-based-certificate management server 300 matches the designated user identification information to the user-specific transaction search keyword information DB 311, extracts the public key record-specific transaction ID information and the user verification-specific transaction ID information, and operates the transaction processing engine 320 to perform control so that the certificate-specific public key and the user verification hash information may be extracted from the public key record-specific transaction information and the user verification-specific transaction information.

When bitcoin-payment-specific transaction information is transmitted, the blockchain holding server 400 authenticates a bitcoin payment through verification of the transmitted bitcoin-payment-specific transaction information and has an electronic wallet with blockchain in which the bitcoin-payment-specific transaction information is to be recorded according to the authentication, and the public key record-specific transaction information including the certificate-specific public key and the user verification-specific transaction information including the user verification hash information are also recorded in the electronic wallet. The blockchain holding server 400 is a member that matches the public key record-specific transaction ID information and the user verification-specific transaction ID information transmitted from the blockchain-based-certificate management server 300 to the electronic wallet and transmits the matched public key record-specific transaction information and user verification-specific transaction information to the blockchain-based-certificate management server 300.

In particular, as main characteristics of the present invention, the block-chain-based certificate management server 300 extracts the certificate-specific public key and the user verification hash information from the public key record-specific transaction information and the user verification-specific transaction information transmitted from the blockchain-based-certificate management server 300 and transmits a certificate validity check signal that is composed of the extracted certificate-specific public key and user verification hash information and also the public key record-specific transaction ID information to the blockchain-based-certificate authentication request server 500.

Also, the blockchain-based-certificate authentication request server 500 extracts corresponding user identification information from the member-specific user identification information DB 511; operates a hash processing engine 520 to hash and process the extracted user identification information to generate preparatory user identification hash information and hash and process the generated preparatory user identification hash information and the public key record-specific transaction ID information included in the certificate validity check signal transmitted from the blockchain-based-certificate management server 300 to generate preparatory user verification hash information; calculates a hash value of the preparatory user verification hash information and a hash value of the user verification hash information included in the certificate validity check signal transmitted from the blockchain-based-certificate management server 300; and transmits the certificate-specific public key included in the certificate validity check signal to the user terminal 100 when the hash values are equal to each other.

Also, the user terminal 100 performs certification on the basis of the transmitted certificate-specific public key.

To this end, the user terminal 100 includes the information storage unit 102 in which an encrypted certificate-specific private key, which is a certificate-specific private key encrypted on the basis of a password and a photo image set by the user, is stored and the encryption/decryption engine 120.

Also, the blockchain-based-certificate authentication request server 500 transmits an encrypted certificate-specific public key, which is a certificate-specific public key encrypted on the basis of a user confirmation request message for requiring the user to enter the set password and photo image.

When the encrypted certificate-specific public key is transmitted, the user terminal 100 extracts an authentication-specific password input screen 151 stored in the information storage unit 102 and outputs the authentication-specific password input screen 151 through the information output unit 101. In this case, the user enters a password registered upon the issuance into a password input box 151a.

Subsequently, when the user terminal 100 extracts an authentication-specific image selection screen 152 stored in the information storage unit 102 and outputs the authentication-specific image selection screen 152 through the information output unit 101, the user selects a corresponding image designated upon the issuance from among a plurality of images.

Subsequently, the user terminal 100 operates the encryption/decryption engine 120 to decrypt the encrypted certificate-specific private key stored in the information storage unit 102 with reference to the transmitted encrypted certificate-specific public key and to perform control so that a user confirmation authentication signal may be transmitted to the blockchain-based-certificate authentication request server 500 when the decrypted certificate-specific private key is matched to the password and photo image entered by the user.

The blockchain-based-certificate management server 300 may discard the issued blockchain-based certificate.

To this end, when a certificate discard signal for requesting discard of the blockchain-based certificate is generated, the blockchain-based-certificate management server 300 operates the transaction processing engine 320 to extract user verification-specific transaction ID information from the user-specific transaction search keyword information DB 311 and transmit the extracted user verification-specific transaction ID information to the blockchain holding server 400.

The blockchain holding server 400 matches the transmitted user verification-specific transaction ID information to the blockchain of the electronic wallet to extract user verification-specific transaction information and transmits the extracted user verification-specific transaction information to the blockchain-based-certificate management server 300.

The transaction processing engine 320 of the blockchain-based-certificate management server 300 receives the user verification-specific transaction information. When corresponding certificate-discard-specific transaction information is recorded in the blockchain holding server 400, the transaction processing engine 320 generates certificate-discard-specific transaction information divided into input data ID3 including discard reserve cost transfer guidance information that performs guidance to transfer a blockchain-based-certificate discard reserve cost charged in a discard-prepared-reserve-specific bitcoin address, multi-bitcoin authorization information including authority for a remitter or a user to use the blockchain-based-certificate discard reserve cost charged in the discard-prepared-reserve-specific bitcoin address, and a bitcoin-payment-specific public key needed to determine validity of the multi-bitcoin authorization information and output data OD3 including a bitcoin address of a remittee to which the blockchain-based-certificate discard reserve cost charged in the discard-prepared-reserve-specific bitcoin address is remitted and discard cost remittee identification information which identifies the remittee, with reference to the output data OD2 of the user verification-specific transaction information, and then transmits the certificate-discard-specific transaction information to the blockchain holding servers 400.

The blockchain holding servers 400 record the transmitted certificate-discard-specific transaction information in the blockchain to discard the blockchain-based certificate of the user.

When the certificate discard signal is generated by the user terminal 100, the blockchain-based-certificate management server 300 transmits the generated certificate-discard-specific transaction information to the user terminal 100 to request the user terminal 100 to digitally sign the transmitted certificate-discard-specific transaction information.

The user terminal 100 operates a transaction signature engine 130 to digitally sign the transmitted certificate-discard-specific transaction information and transmits the digitally signed certificate-discard-specific transaction information to the blockchain-based-certificate management server 300.

Subsequently, the blockchain-based-certificate management server 300 performs control so that the certificate-discard-specific transaction information digitally signed by the user and transmitted from the user terminal 100 may be transmitted to the blockchain holding servers 400.

Also, when the certificate discard signal is autonomously generated, the blockchain-based-certificate management server 300 operates the transaction processing engine 320 to allow a remitter corresponding to the blockchain-based-certificate management server 300 to digitally sign the certificate-discard-specific transaction information, and to perform control so that the certificate-discard-specific transaction information digitally signed by the remitter may be transmitted to the blockchain holding servers 400.

A process of authenticating a blockchain-based certificate by means of a blockchain-based-certificate authentication system of the present invention will be described as follows.

The user terminal 100 accesses the blockchain-based-certificate authentication request server 500 to request blockchain-based certification (S300).

The blockchain-based-certificate authentication request server 500 extracts the designated user identification information of the user operating the user terminal 100 from the member-specific user identification information DB 511 according to the request for the blockchain-based certification of the user terminal 100 and transmits the designated user identification information to the blockchain-based-certificate management server 300 (S310).

The blockchain-based-certificate management server 300 matches the transmitted designated user identification information to the user-specific transaction search keyword information DB 311, transmits matching public key record-specific transaction ID information and user verification-specific transaction ID information to the blockchain holding servers 400, and requests downloading of public key record-specific transaction information and user verification-specific transaction information (S320).

The blockchain holding server 400 matches the transmitted public key record-specific transaction ID information and user verification-specific transaction ID information to the electronic wallet and transmits matching public key record-specific transaction information and user verification-specific transaction information to the blockchain-based-certificate management server 300 (S330).

The blockchain-based-certificate management server 300 operates the transaction processing engine 320 to extract a discard-prepared-reserve-specific bitcoin address from the discard reserve cost transfer information included in the transmitted user verification-specific transaction information, generates a blockchain-based-certificate discard check request signal for inquiring about whether a blockchain-based-certificate discard reserve cost corresponding to the amount of bitcoin charged in the extracted discard-prepared-reserve-specific bitcoin address is transferred, and transmits the generated blockchain-based-certificate discard check request signal to the blockchain holding server 400 (S340).

The blockchain holding server 400 matches the discard-prepared-reserve-specific bitcoin address included in the transmitted blockchain-based-certificate discard check request signal to the blockchain and transmits, to the blockchain-based-certificate management server 300, a blockchain-based-certificate discard notification signal for notifying of whether the blockchain-based-certificate discard reserve cost charged in the matched discard-prepared-reserve-specific bitcoin address is transferred (S350).

With reference to the transmitted blockchain-based-certificate discard notification signal, the transaction processing engine 320 of the blockchain-based-certificate management server 300 checks whether the blockchain-based-certificate discard reserve cost charged in the discard-prepared-reserve-specific bitcoin address is transferred (S360). When the blockchain-based-certificate discard reserve cost charged in the discard-prepared-reserve-specific bitcoin address is transferred, the transaction processing engine 320 performs control so that a message indicating that the blockchain-based certification process has been rejected may be transmitted to the user terminal 100 (S361). When the blockchain-based-certificate discard reserve cost charged in the discard-prepared-reserve-specific bitcoin address is not transferred, the blockchain-based-certificate management server 300 operates the transaction processing engine 320 to extract a certificate-specific public key and user verification hash information from the transmitted public key record-specific transaction information and the user verification-specific transaction information (S370).

The blockchain-based-certificate management server 300 transmits a certificate validity check signal composed of the extracted certificate-specific public key and user verification hash information and the public key record-specific transaction ID information stored in the user-specific transaction search keyword information DB 311 to the blockchain-based-certificate authentication request server 500 (S380).

The blockchain-based-certificate authentication request server 500 extracts corresponding user identification information from the member-specific user identification information DB 511 and operates the hash processing engine 520 to hash and process the extracted user identification information to generate preparatory user identification hash information and to hash and process the generated preparatory user identification hash information and the public key record-specific transaction ID information included in the certificate validity check signal transmitted from the blockchain-based-certificate authentication request server 500 to generate preparatory user verification hash information (S390).

Subsequently, the hash processing engine 520 of the blockchain-based-certificate authentication request server 500 calculates a hash value of the preparatory user verification hash information and a hash value of the user verification hash information included in the certificate validity check signal transmitted from the blockchain-based-certificate management server 300 and checks whether the hash values are equal to each other (S400). When the hash values are not equal to each other, the hash processing engine 520 performs control so that a message indicating that the blockchain-based certification process has been rejected may be transmitted to the user terminal 100 (S401).

The blockchain-based-certificate authentication request server 500 calculates the hash value of the user verification hash information and the hash value of the preparatory user verification hash information and transmits the certificate-specific public key included in the authentication validity check signal to the user terminal 100 when the calculated hash values are equal to each other (S410).

Subsequently, the user terminal 100 performs certification on the basis of the transmitted certificate-specific public key (S420).

The user terminal 100 checks whether a certificate discard signal for requesting discard of the blockchain-based certificate is generated (S430). When the certificate discard signal for requesting discard of the blockchain-based certificate is generated, the user terminal 100 checks which of the user terminal 100 and the blockchain-based-certificate management server 300 has generated the certificate discard signal (S440).

First, when the certificate discard signal for requesting the discard of the blockchain-based certificate is generated by the user terminal 100, the user terminal 100 transmits the generated certificate discard signal toward the blockchain-based-certificate management server 300 (S450).

The blockchain-based-certificate management server 300 operates the transaction processing engine 320 to match the transmitted certificate discard signal to the user-specific transaction search keyword information DB 311 to extract user verification-specific transaction ID information and transmits the user verification-specific transaction ID information to the blockchain holding server 400 (S460).

The blockchain holding server 400 matches the transmitted user verification-specific transaction ID information to the blockchain of the electronic wallet to extract user verification-specific transaction information and transmits the extracted user verification-specific transaction information to the blockchain-based-certificate management server 300 (S470).

Subsequently, the transaction processing engine 320 of the blockchain-based-certificate management server 300 receives the user verification-specific transaction information. When corresponding certificate-discard-specific transaction information is recorded in the blockchain holding server 400, the transaction processing engine 320 generates certificate-discard-specific transaction information divided into input data ID3 including discard reserve cost transfer guidance information that performs guidance to transfer a blockchain-based-certificate discard reserve cost charged in a discard-prepared-reserve-specific bitcoin address, multi-bitcoin authorization information including an authority for a remitter or a user to use the blockchain-based-certificate discard reserve cost charged in the discard-prepared-reserve-specific bitcoin address, and a bitcoin-payment-specific public key needed to determine validity of the multi-bitcoin authorization information and output data OD3 including a bitcoin address of a remittee to which the blockchain-based-certificate discard reserve cost charged in the discard-prepared-reserve-specific bitcoin address is remitted and discard cost remittee identification information which identifies the remittee, with reference to the output data OD2 of the user verification-specific transaction information, and then transmits the certificate-discard-specific transaction information to the user terminal to request the user to digitally sign the certificate-discard-specific transaction information (S480).

The user terminal 100 operates the transaction signature engine 130 to digitally sign the transmitted certificate-discard-specific transaction information and transmits the digitally signed certificate-discard-specific transaction information to the blockchain-based-certificate management server 300 (S490).

The blockchain-based-certificate management server 300 transmits the transmitted certificate-discard-specific transaction information digitally signed by the user to the blockchain holding servers 400 (S500).

The blockchain holding servers 400 record the transmitted certificate-discard-specific transaction information digitally signed by the user in the blockchain (S510) to discard the blockchain-based certificate of the user.

During the process of checking which of the user terminal 100 and the blockchain-based-certificate management server 300 has generated the certificate discard signal when generating the certificate discard signal for requesting the discard of the blockchain-based authenticate (S440), when the certificate discard signal for requesting the discard of the blockchain-based certificate is generated by the blockchain-based-certificate management server 300, the blockchain-based-certificate management server 300 operates the transaction processing engine 320 to receive the user verification-specific transaction information. When corresponding certificate-discard-specific transaction information is recorded in the blockchain holding server 400, the blockchain-based-certificate management server 300 generates certificate-discard-specific transaction information divided into input data ID3 including discard reserve cost transfer guidance information that performs guidance to transfer a blockchain-based-certificate discard reserve cost charged in a discard-prepared-reserve-specific bitcoin address, multi-bitcoin authorization information including an authority for a remitter or a user to use the blockchain-based-certificate discard reserve cost charged in the discard-prepared-reserve-specific bitcoin address, and a bitcoin-payment-specific public key needed to determine validity of the multi-bitcoin authorization information and output data OD3 including a bitcoin address of a remittee to which the blockchain-based-certificate discard reserve cost charged in the discard-prepared-reserve-specific bitcoin address is remitted and discard cost remittee identification information which identifies the remittee, with reference to the output data OD2 of the user verification-specific transaction information, allows a remitter corresponding to the blockchain-based-certificate management server 300 to digitally sign the generated certificate-discard-specific transaction information, and then transmits the certificate-discard-specific transaction information digitally signed by the remitter to the blockchain holding servers 400 (S441).

The blockchain holding servers 400 record the transmitted certificate-discard-specific transaction information digitally signed by the remitter in the blockchain (S442) to discard the blockchain-based certificate of the user.

Figure 15:
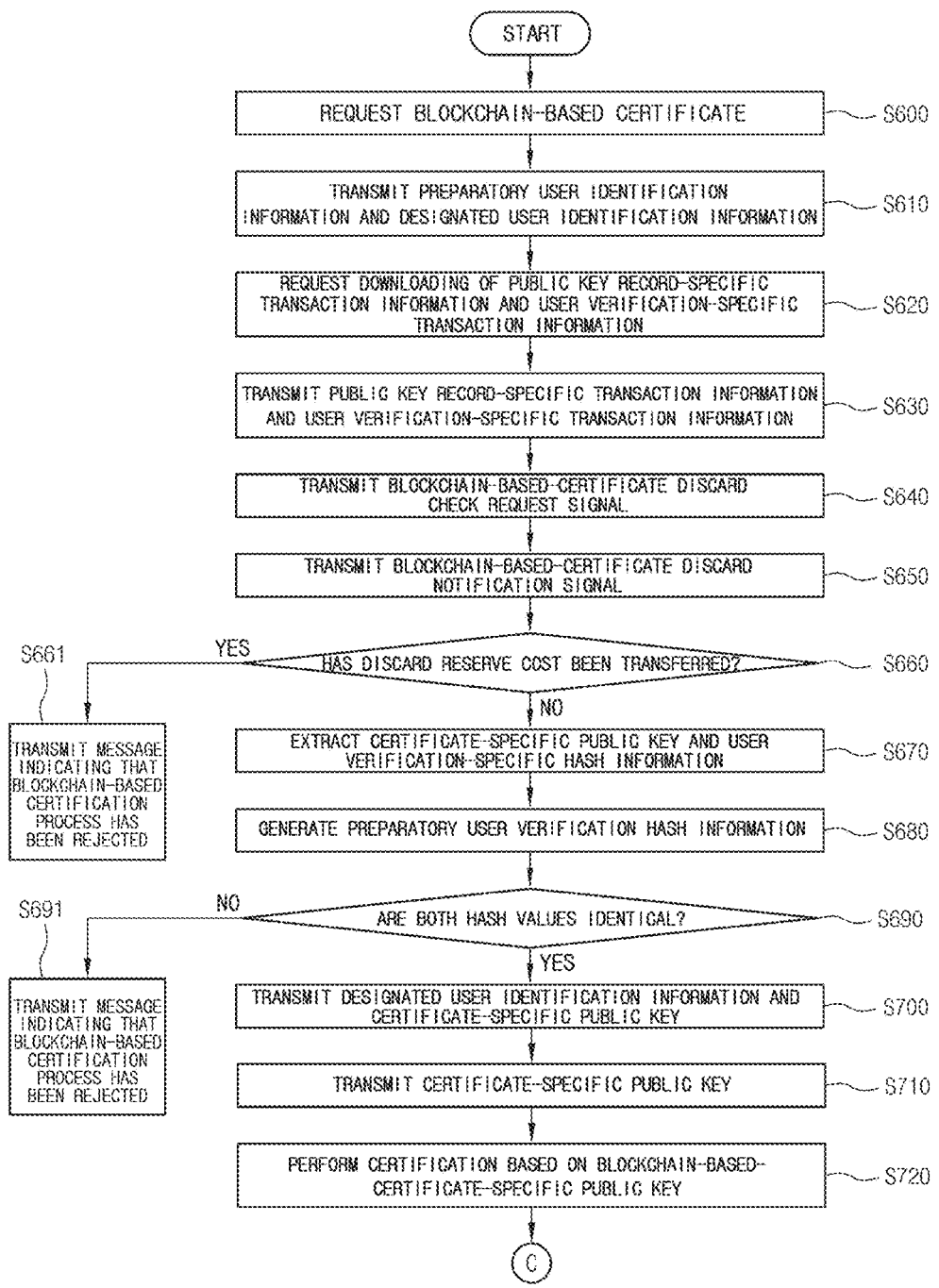
FIGS. 15 to 17 are flowcharts showing a blockchain-based-certificate authentication process according to another embodiment.
Figure 16:
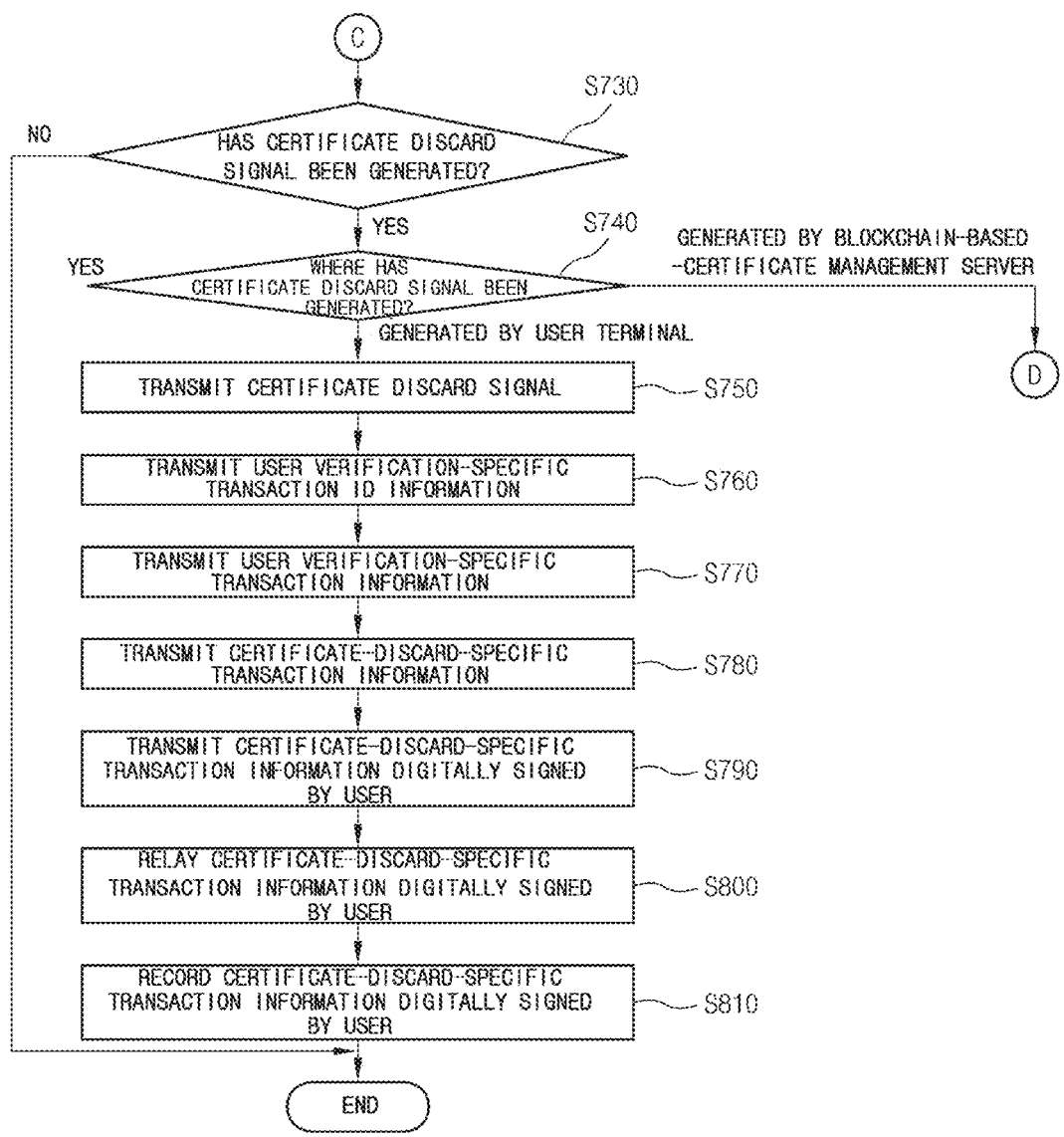
Figure 17:
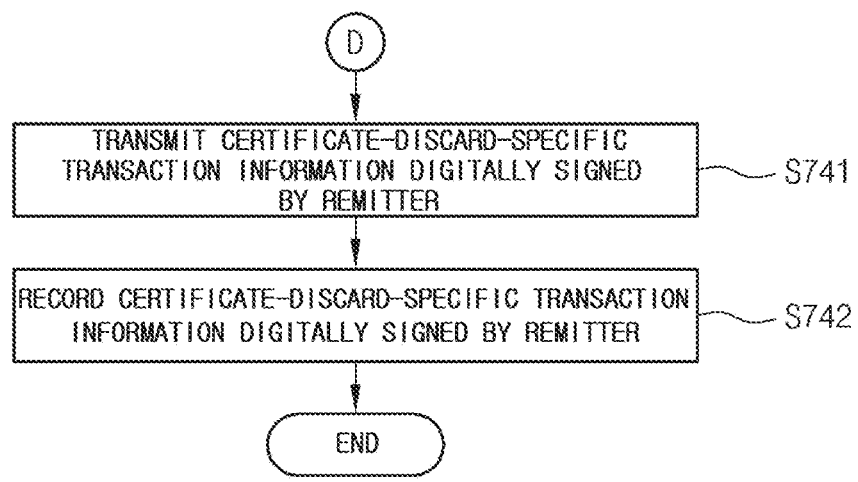

Last, FIGS. 15 to 17 illustrate a blockchain-based-certificate authentication method according to another embodiment. Here, a certificate authentication system has the same reference numerals as that of the aforementioned blockchain-based-certificate authentication system, but has a different operating relation. Therefore, drawings related to the certificate authentication system will be omitted.

The blockchain-based-certificate authentication system and method according to this embodiment are different from the aforementioned blockchain-based-certificate authentication system and method, depending on whether the blockchain-based-certificate authentication request server 500 or the blockchain-based-certificate management server 300 calculates and determines the hash values of the user verification hash information and the preparatory user verification hash information in order to determine whether the user is authorized.

In other words, the blockchain-based-certificate authentication system according to another embodiment includes a user terminal 100 configured to request blockchain-based certification; a blockchain-based-certificate authentication request server 500 configured to extract identification information of a corresponding user from a member-specific user identification information DB 511 according to the request for the blockchain-based certification of the user terminal 100, hash and process the extracted user identification information to generate preparatory user identification hash information, and transmit the generated preparatory user identification hash information and designated user identification information of the corresponding user; a blockchain-based-certificate management server 300 configured to receive the preparatory user identification hash information and the designated user identification information from the blockchain-based-certificate authentication request server 500, match the designated user identification information to a user-specific transaction search keyword information DB 311, transmit matching public key record-specific transaction ID information and user verification-specific transaction ID information, and request downloading of public key record-specific transaction information and user verification-specific transaction information; and a blockchain holding server 400 configured to authenticate a bitcoin payment through verification of bitcoin-payment-specific transaction information when the bitcoin-payment-specific transaction information is transmitted, wherein the blockchain holding server 400 has an electronic wallet with blockchain in which the bitcoin-payment-specific transaction information is to be recorded according to the authentication and wherein user verification-specific transaction information including user verification hash information and public key record-specific transaction information including a certificate-specific public key are also recorded in the electronic wallet, and configured to match the public key record-specific transaction ID information and the user verification-specific transaction ID information transmitted from the blockchain-based-certificate management server 300 to the electronic wallet and transmit matching public key record-specific transaction information and user verification-specific transaction information to the blockchain-based-certificate management server 300. The blockchain-based-certificate management server 300 extracts the certificate-specific public key and the user verification hash information from the public key record-specific transaction information and the user verification-specific transaction information transmitted from the blockchain holding server 400, hashes and processes the transmitted preparatory user identification hash information and the public key record-specific transaction ID information stored in the user-specific transaction search keyword information DB 311 to generate preparatory user verification hash information, calculates a hash value of the extracted user verification hash information and a hash value of the generated preparatory user verification hash information, and transmits the extracted certificate-specific public key and the designated user identification information of the corresponding user to the blockchain-based-certificate authentication request server 500 when the hash values are equal to each other. The blockchain-based-certificate authentication request server 500 transmits the transmitted certificate-specific public key to the user terminal 100 with reference to the designated user identification information.

The user terminal 100 performs certification on the basis of the transmitted certificate-specific public key.

Through such a configuration, the blockchain-based-certificate authentication method according to another embodiment includes a user terminal 100 accessing a blockchain-based-certificate authentication request server 500 to request blockchain-based certification (S600); the blockchain-based-certificate authentication request server 500 extracting identification information of a corresponding user from a member-specific user identification information DB 511 according to the request for the blockchain-based certification, operating a hash processing engine 520 to hash and process the extracted user identification information to generate preparatory user identification hash information, and transmitting the generated preparatory user identification hash information and designated user identification information of the corresponding user to a blockchain-based-certificate management server 300 (S610); the blockchain-based-certificate management server 300 receiving the preparatory user identification hash information and the designated user identification information, matching the designated user identification information to a user-specific transaction search keyword information DB 311, and transmitting matching public key record-specific transaction ID information and user verification-specific transaction ID information to a blockchain holding server 400 to request downloading of public key record-specific transaction information and user verification-specific transaction information (S620); the blockchain holding server 400 matching the transmitted public key record-specific transaction ID information and the user verification-specific transaction ID information to an electronic wallet and transmitting matching public key record-specific transaction information and user verification-specific transaction information to the blockchain-based-certificate management server 300 (S630); the blockchain-based certificate management server 300 operating a transaction processing engine 320 to extract a certificate-specific public key and user verification hash information from the transmitted public key record-specific transaction information and user verification-specific transaction information (S670); the blockchain-based-certificate management server 300 operating a hash processing engine 330 to hash and process the transmitted preparatory user identification hash information and the public key record-specific transaction ID information stored in the user-specific transaction search keyword information DB 311 to generate preparatory user verification hash information (S680); the hash processing engine 330 of the blockchain-based-certificate management server 300 calculating a hash value of the extracted user verification hash information and a hash value of the generated preparatory user verification hash information and checking whether the calculated hash values are equal to each other (S690); the blockchain-based-certificate management server 300 transmitting the extracted certificate-specific public key and the designated user identification information of the corresponding user to the blockchain-based-certificate authentication request server 500 when the hash value of the extracted user verification hash information is equal to the hash value of the generated preparatory user verification hash information (S700); the blockchain-based-certificate authentication request server 500 transmitting the transmitted certificate-specific public key to the user terminal 100 with reference to the designated user identification information (S710); and the user terminal 100 performing certification on the basis of the transmitted certificate-specific public key (S720).

DESCRIPTION OF SYMBOLS

100: user terminal
101: information output unit
102: information storage unit
110: key generation engine
120: encryption/decryption engine
130: transaction signature engine
141: user identification information input screen
141a: user name input box
141b: user date-of-birth input box
141c: user phone number input box
141d: user email input box
142: network block notification screen
143: network block indication screen
144: password input screen
144a, 151a: password input box
145: image selection screen
146: key generation notification screen
147: network connection indication screen
148: issuance completion notification screen
151: authentication-specific password input screen
152: authentication-specific image selection screen
200: blockchain-based-certificate issuance request server
210, 310, 510: DB unit
211, 511: member-specific user identification information DB
220, 330, 520: hash processing engine
300: blockchain-based-certificate management server
311: user-specific transaction search keyword information DB
400: blockchain holding server
500: blockchain-based-certificate authentication request server

What is claimed is:

1. A system configured to issue a certificate comprising:
a certificate issuance request server;
a blockchain network;
a user terminal communicatively coupled, via a network, to the certificate issuance request server, a certificate management server, and the blockchain network, wherein the user terminal comprises a user terminal processor coupled to a user terminal non-transitory computer-readable storage medium having stored thereon software instructions that, when executed by the user terminal processor, cause the user terminal processor to:
  receive, from the certificate issuance request server, a key generation guidance signal;
  in response to receiving the key generation guidance signal, block a network connection with the network;
  generate, a public key and private key of a user;
  in response to generating the public key and private key of the user, reconnecting to the network; and
  in response to reconnecting to the network, transmit the generated public key and personal information of the user to the certificate issuance request server;
a certificate management server communicatively coupled, via the network, to the user terminal, the certificate issuance request server, and the block chain network, wherein the certificate management server comprises a processor coupled to a memory having stored thereon software instructions that, when executed by the processor, cause the processor to:
  receive, from the certificate issuance request server, a certificate registration request including user identification information, the public key of the user, and identification hash information, wherein the identification hash information is generated by hashing pieces of the personal information of the user, and wherein the user identification information is generated by using specific personal information among the pieces of personal information of the user;
  generate a certification transaction including the public key;
  generate a certification transaction ID for matching the certification transaction in a distributed ledger of a blockchain network comprising blockchain nodes;
  broadcast the certification transaction to the blockchain nodes;
  hash the user identification information and the certification transaction ID to generate verification hash information;
  generate a verification transaction including the verification hash information;
  generate a verification transaction ID for matching the verification transaction in the distributed ledger of the blockchain network;
  broadcast the verification transaction to the blockchain nodes;
  broadcast the certification transaction ID and the verification transaction ID to the blockchain nodes;
  confirm, by using the certification transaction ID and the verification transaction ID, whether the certification transaction and the verification transaction are registered in the distributed ledger of the blockchain network; and
  in response to a registration of the certification transaction and the verification transaction in the distributed ledger being confirmed, notify a certificate registration result to the user terminal.

2. The system of claim 1, wherein the personal information of the user includes at least two of a name of the user, a date of birth of the user, a phone number of the user, and an email of the user, and
wherein the user identification information is the phone number of the user.

3. The system of claim 1, wherein the processor of the certificate management server stores the user identification information in a user transaction search keyword information database, and matches the certification transaction ID and the verification transaction ID with the user identification information in the user transaction search keyword information database.

4. The system of claim 1, wherein the certification transaction further includes previous cryptocurrency payment transaction ID information used to identify a storage position of a cryptocurrency to be used among cryptocurrencies held by a remitter through previous cryptocurrency payment transaction information; cryptocurrency authorization information of the remitter; a cryptocurrency payment public key needed to determine validity of the cryptocurrency authorization information; and certification transaction registration cost information corresponding to a cost required to register the certification transaction.

5. The system of claim 1, wherein the verification transaction further includes previous cryptocurrency payment transaction ID information used to identify a storage position of a cryptocurrency to be used among cryptocurrencies held by a remitter through previous cryptocurrency payment transaction information; cryptocurrency authorization information of the remitter; a cryptocurrency payment public key needed to determine validity of the cryptocurrency authorization information; and verification transaction registration cost information corresponding to a cost required to register the verification transaction.

6. The system of claim 5, wherein the verification transaction further includes certificate discard reserve cost information corresponding to a cost to be used to discard the certificate, and discard reserve cost transfer information indicating a discard-prepared-reserve cryptocurrency address and a certificate discard reserve cost corresponding to the certificate discard reserve cost information so that the corresponding a certificate discard reserve cost is transferred to a designated cryptocurrency address when the verification transaction is recorded in the distributed ledger of the blockchain network.

7. The system of claim 1, wherein the certificate issuance request server receives the pieces of the personal information of the user from the user terminal, determines whether at least one of the pieces of the personal information of the user matches any information within a member user identification information database, generates a key generation guidance signal when at least one of the pieces of the personal information of the user matches any of the information within the member user identification information database, transmits the key generation guidance signal to the user terminal, and receives the public key of the user.

8. The system of claim 7, wherein the user terminal has a key generation engine, and
wherein the key generation engine generates the public key of the user and a private key of the user in response to the user terminal receiving the key generation guidance signal.

9. The system of claim 8, wherein the user terminal comprises an information storage unit and an encryption/decryption engine, and wherein the encryption/decryption engine generates an encrypted private key by encrypting the private key of the user on the basis of a password and a photo image, and stores the encrypted private key in the information storage unit.

10. The system of claim 9, wherein the information storage unit includes a key generation notification screen unit, and
wherein the key generation notification screen unit includes:
a user personal information input screen including a user name input box receives a name of the user, a user date-of-birth input box receives a date of birth of the user, a user phone number input box receives a phone number of the user, and a user email input box receives an email of the user;
a network block notification screen indicates that a network to which the user terminal is connected will be blocked before the public key of the user and the private key of the user are generated;
a network block indication screen indicates that the network is blocked;
a password input screen including a password input box receives the password;
an image selection screen displays a plurality of images and receives a selection of the photo image from among the plurality of images;
a key generation notification screen indicates that the public key of the user and the private key of the user are generated;
a network connection indication screen indicates that the user terminal is reconnected to the network after the public key of the user and the private key of the user are generated; and
an issuance completion notification screen indicates that issuance of the certificate is complete.

\* \* \* \* \*